(12) United States Patent
Shimizu et al.

(10) Patent No.: US 8,136,857 B2
(45) Date of Patent: Mar. 20, 2012

(54) PICK-UP STYLE UTILITY VEHICLE WITH EXPANDABLE CARGO BED

(75) Inventors: Hirohito Shimizu, Kobe (JP); Masashi Kanai, Kobe (JP); Hideyuki Takahashi, Kobe (JP); Yoshitaka Awazu, Kakogawa (JP); Austin Stauffer, Lincoln, NE (US); Shigeru Yamashita, Akashi (JP); Shigeto Nakamura, Himeji (JP); Mike Boyle, Lincoln, NE (US); Takashi Miyauchi, Akashi (JP); Yoshiya Takehara, Akashi (JP); Kentaro Shimomura, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 108 days.

(21) Appl. No.: 12/649,826

(22) Filed: Dec. 30, 2009

(65) Prior Publication Data
US 2011/0156429 A1    Jun. 30, 2011

(51) Int. Cl.
*B62D 33/08* (2006.01)

(52) U.S. Cl. .................................. 296/26.09
(58) Field of Classification Search .............. 296/24.4, 296/24.43, 26.08, 26.09, 26.1, 26.11, 63, 296/65.01, 66, 65.05, 65.09, 183.1, 186.4; 280/DIG. 5
See application file for complete search history.

(56) References Cited

U.S. PATENT DOCUMENTS

| | | | | |
|---|---|---|---|---|
| 3,169,792 A * | 2/1965 | Solano Viquez | ............. | 296/99.1 |
| 4,480,868 A * | 11/1984 | Koto | ......................... | 296/190.11 |
| 6,260,916 B1 * | 7/2001 | Hunt | ......................... | 296/190.11 |
| 6,398,291 B1 * | 6/2002 | Reusswig et al. | .......... | 296/186.4 |
| 6,450,566 B1 * | 9/2002 | Hong | ......................... | 296/190.11 |
| 6,478,355 B1 * | 11/2002 | Van Eden et al. | ............. | 296/37.6 |
| 6,481,772 B1 * | 11/2002 | Tenn | ......................... | 296/26.11 |
| 6,517,135 B2 * | 2/2003 | de Gaillard | ................ | 296/26.09 |
| 6,786,535 B1 * | 9/2004 | Grzegorzewski et al. | ......................... | 296/190.11 |
| 6,905,159 B1 | 6/2005 | Saito et al. | | |
| 6,994,388 B2 | 2/2006 | Saito et al. | | |
| 7,249,798 B2 | 7/2007 | Saito et al. | | |
| 7,578,544 B1 * | 8/2009 | Shimamura et al. | ........ | 296/183.2 |
| 7,735,889 B2 * | 6/2010 | Yamamura et al. | ........ | 296/24.43 |
| 7,735,896 B2 * | 6/2010 | Kubota | ........................... | 296/69 |
| 7,841,639 B2 * | 11/2010 | Tanaka et al. | ............... | 296/65.05 |

* cited by examiner

Primary Examiner — H Gutman
(74) Attorney, Agent, or Firm — Wenderoth, Lind & Ponack, LLP

(57) ABSTRACT

A pick-up style utility vehicle includes a front seat, a rear seat, a cargo bed expandable in a front direction, and a screen shield arranged at a front end of the cargo bed. The cargo bed can be changed between an expanded state in which the cargo bed is expanded in a front direction into a riding space, and a non-expanded state not occupying the riding space. The screen shield is slidably supported by a vehicle body configuring portion, for example, a guide portion provided on an expandable side panel and extending in a front and rear direction, so as to be movable in a front and rear direction between an expanded position and a non-expanded position.

3 Claims, 28 Drawing Sheets

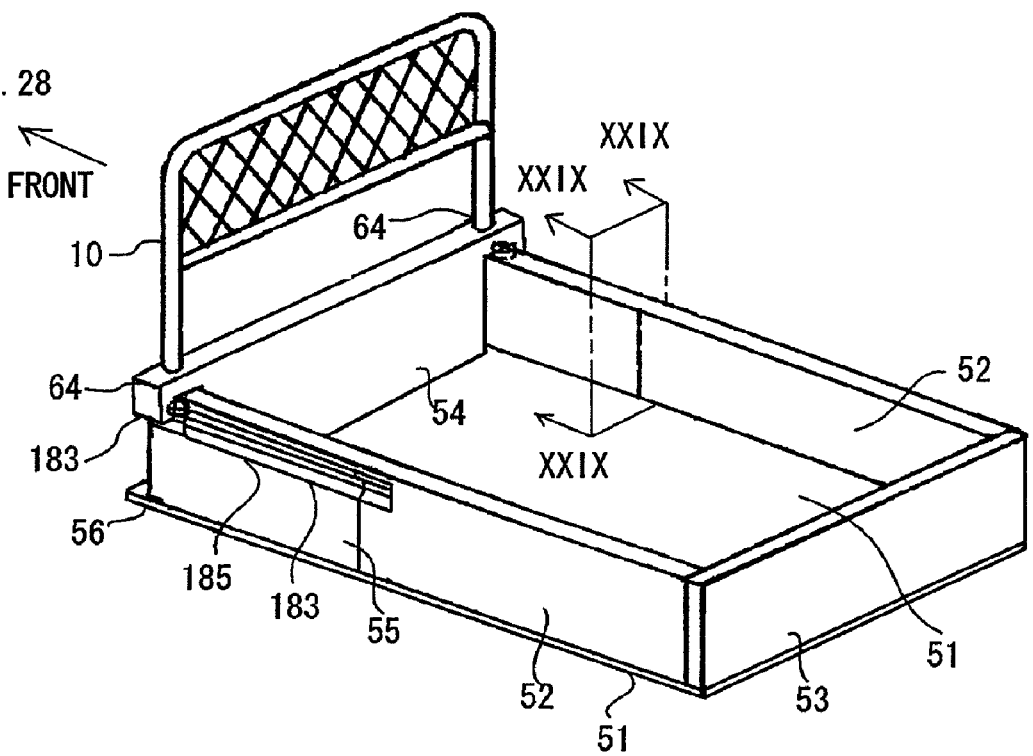

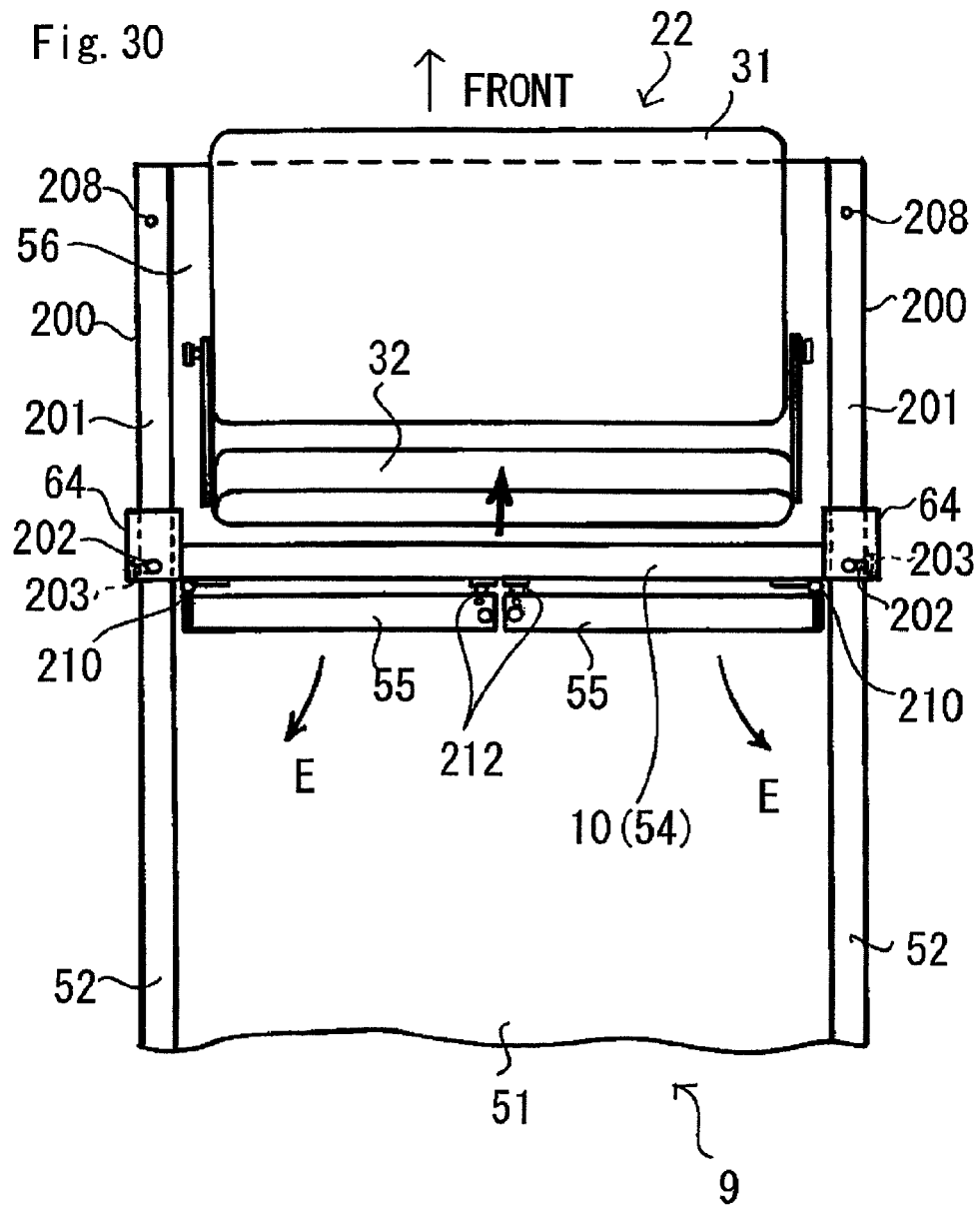

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly applied the inventions relating to the pick-up style utility vehicle with a cargo bed whose area or capacity can be expanded. Their applications have been filed, which are, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from front. The rear seat is changed between a used state and a retracted state to switch between 2 passengers transformation and 4 passengers transformation. In the 2 passengers transformation, a front portion of the cargo bed can be expanded to a riding space occupied by the rear seat in the used state.

Typically, a screen shield is provided at the front end of the cargo bed of the pick-up style utility vehicle so as not to move a load loaded on the cargo bed into the riding space in front of the cargo bed. The screen shield need be changed between the 2 passengers transformation expanding the cargo bed in a front direction, and the 4 passengers transformation not expanding the cargo bed.

FIG. 34 shows an example of the expandable cargo bed disclosed in the related art documents. A cargo bed 400 has a stationary bottom plate 401, right and left stationary side panels 402, a pair of right and left expandable side panels 404 provided at the front ends of the stationary side panels 402 and rotatably supported about hinge shafts 403, an expandable bottom plate 405 provided at the front end of the stationary bottom plate 401, and a front panel 406. A screen shield 407 is integrally formed with the front panel 406.

Pins 410 for positioning and fixing protruded in a downward direction are provided at the right and left ends of the screen shield 407. Pin insertion holes 411 and 412 into which each of the pins 410 of the screen shield 407 can be inserted are formed in the upper surface of the end of each of the expandable side panels 404 and the upper surface of the front end of each of the stationary side panels 402.

As indicated by the solid lines in FIG. 34, when the expandable side panels 404 are closed (4 passengers transformation), the screen shield 407 is located at the front ends of the stationary side panels 402 and the pins 410 of the screen shield 407 are inserted into the pin insertion holes 412 of the stationary side panels 402 from above. As indicated by the imaginary lines, when the expandable side panels 404 are opened in a front direction (2 passengers transformation), the screen shield 407 is located at the front ends of the expandable side panels 404 and the pins 410 of the screen shield 407 are inserted into the pin insertion holes 411 of the expandable side panels 404 from above.

With the above configuration, the screen shield 407 is moved between an expanded position when the cargo bed 400 is expanded and a non-expanded position when the cargo bed 400 is not expanded. The screen shield 407 need be lifted together with the front panel 406 to pull out the right and left pins 410 from the pin insertion holes 411 or 412. The screen shield 407 and the front panel 406 then need be integrally moved in a rear or front direction. After the movement, the pins 410 need be inserted into the pin insertion holes 412 or 411 from above again.

However, a weight of the screen shield 407 integrally having the front panel 406 is large, and a width of the screen shield 407 extends throughout the substantially whole width of the cargo bed 400. Therefore, it is very difficult to move the screen shield 407 by one person. Accordingly, at present, the screen shield 407 is lifted by grabbing the right and left ends of the screen shield 407 and the front panel 406 by two operators to pull out the pins 410. After the movement, the pins 410 need be inserted into the pin insertion holes 411 or 412 again. Thus, it takes time to move the screen shield 407.

SUMMARY OF THE INVENTION

The present invention has been made in view of the above problems and an object of the present invention is to simplify expanding and contracting operations of a cargo bed and a moving operation of a screen shield therewith, thereby performing the operations easily and immediately even by one operator.

Another object of the present invention is to easily change a state of a rear seat with the expanding or contracting operation of the cargo bed.

To achieve the above objects, the present invention provides a pick-up style utility vehicle including a front seat, a rear seat, and a cargo bed in this order from front, and a screen shield partitioning the cargo bed and a riding space in front of the cargo bed, wherein the cargo bed is changed between an expanded state in which the cargo bed is expanded in a front direction to the riding space, and a non-expanded state not occupying the riding space, and the screen shield is slidably supported by a guide portion of a vehicle body so as to move in a front or rear direction between an expanded position and a non-expanded position.

With the above configuration, in the expanding or contracting operation of the cargo bed, the screen shield can be changed between the expanded position and the non-expanded position without being lifted. That is, the position of the screen shield can be easily changed even by one operator.

According to the present invention, preferably, the front panel of the cargo bed is integrally provided with the screen shield so as to be moved in a front or rear direction together with the screen shield.

With the above configuration, the changing operation of the screen shield between the expanded position and the non-expanded position can change the front panel of the cargo bed between the non-expanded position and the expanded position at the same time. Therefore, the number of steps of the changing operation of the cargo bed can be reduced.

According to the present invention, preferably, the guide portion is provided on a side panel of the cargo bed. For example, the guide portion is provided on an upper end face of the side panel, an inner side surface of the side panel in a vehicle width direction, or an outer side surface of the side panel in a vehicle width direction.

When the guide portion is provided on the upper end face of the side panel, high supporting strength relative to the load of the screen shield can be maintained. When the guide portion is provided on the inner side surface or the outer side surface of the side panel in a vehicle width direction, accumulation of dust and rain in the guide portion can be prevented.

According to the present invention, the screen shield abuts the guide portion via a roller.

With the above configuration, a friction resistance of the slide movement of the screen shield is reduced so that the screen shield can be moved by a small force.

According to the present invention, the guide portion is provided on a cabin frame surrounding the riding space, and the screen shield is overhung so as to slide in a front or rear direction.

With the above configuration, since the guide portion is provided on the cabin frame, the rigidity of the cabin frame can be increased. In addition, since the screen shield is overhung, the upper portion of the riding space can be effectively used as the arranging space of the guide portion.

According to the present invention, the rear seat is changed between a used state in which a passenger is be seated and a retracted state in which the cargo bed is expanded, and the rear seat and the screen shield are coupled by an interlocking mechanism so as to change the screen shield between the non-expanded position and the expanded position with the change of the rear seat between the used state and the retracted state.

With the above configuration, the changing operation of the rear seat between the used state and the retracted state, and the expanding and contracting operations of the cargo bed can be performed by one operation. As a result, the operability is improved.

BRIEF DESCRIPTION OF THE DRAWINGS

FIG. 28 is a perspective view of the cargo bed of FIG. 27 when the cargo bed is expanded;

FIG. 30 is a plan view of a cargo bed according to a seventh embodiment of the present invention when the cargo bed is not expanded;

DETAILED DESCRIPTION OF THE PREFERRED EMBODIMENTS

Outline of a Pick-Up Style Utility Vehicle According to the Present Invention

Figure 1:
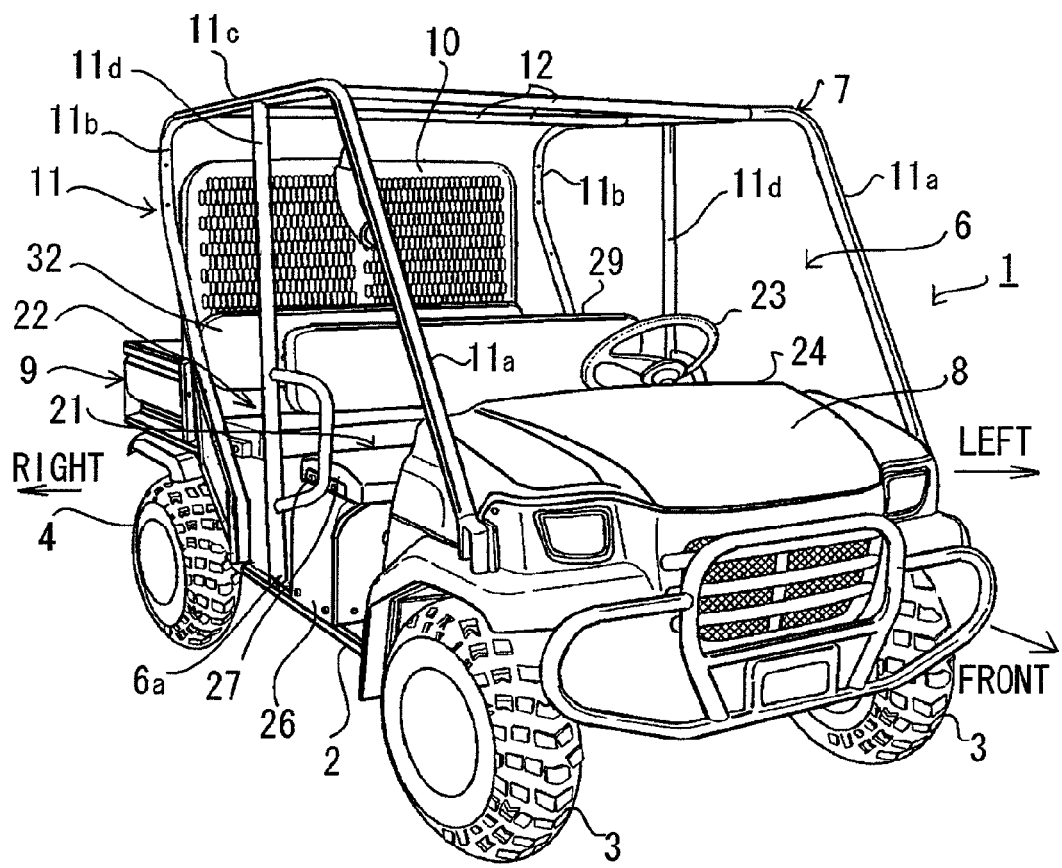
FIG. 1 is a perspective view of a pick-up style utility vehicle according to the present invention.
Figure 2:
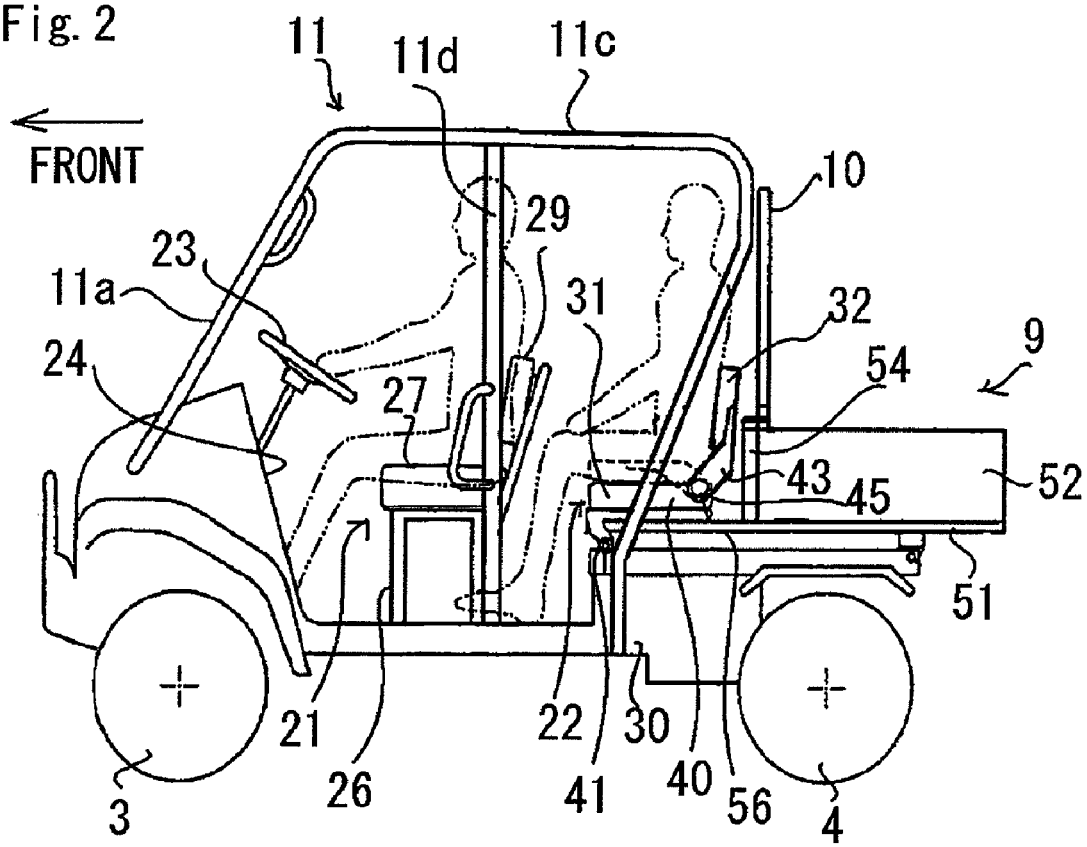
FIG. 2 is a left side view of the pick-up style utility vehicle of FIG. 1 when a cargo bed is not expanded.
Figure 3:
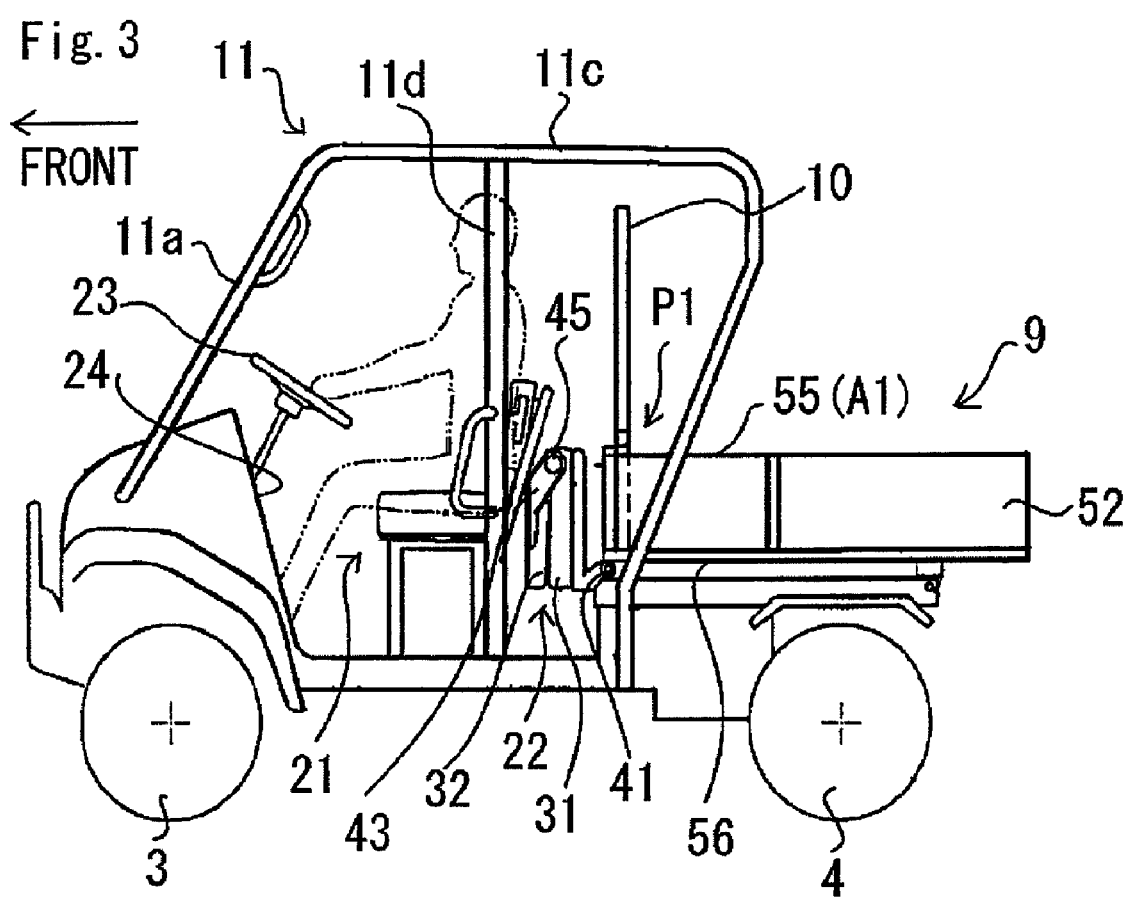
FIG. 3 is a left side view of the pick-up style utility vehicle of FIG. 1 when the cargo bed is expanded.

FIGS. 1 to 3 show a pick-up style utility vehicle with an expandable cargo bed according to the present invention. The pick-up style utility vehicle can be changed between 4 passengers transformation contracting a cargo bed 9, as shown in FIG. 2 and 2 passengers transformation folding a rear seat 22 and expanding the cargo bed 9 in a front direction, as shown in FIG. 3. A configuration of the pick-up style utility vehicle will be described below in detail with reference to the drawings.

FIG. 1 is a perspective view of the pick-up style utility vehicle. A pick-up style utility vehicle 1 has a vehicle body 2 supported by a pair of right and left front wheels 3 and a pair of right and left rear wheels 4. A cabin frame 7 configuring a cabin 6 is provided in an intermediate portion above the vehicle body 2 in a front or rear direction. A hood 8 is provided in front of the cabin frame 7. The cargo bed 9 is provided behind the cabin frame 7. A screen shield 10 partitioning the cargo bed 9 and a riding space is provided at a front end of the cargo bed 9 so as to be adjustable in a front or rear direction.

The cabin frame 7 surrounding the cabin 6 has a pair of right and left side frame members 11 formed in a U shape and made of a metal pipe, and a plurality of cross frame members 12 made of a metal pipe coupling the side frame members 11. Each of the side frame members 11 has a front side portion 11a extended in a rear direction and in an upward direction from near the right or left side portion of the hood 8, a rear side portion 11b extended in a substantially upward direction from the right or left side portion at the rear end of the cabin 6, an upper side portion 11c integrally coupling the upper end of the front side portion 11a and the upper end of the rear side portion 11b and extended in a front or rear direction, and an intermediate longitudinal portion 11d coupling the intermediate portion of the upper side portion 11c in a front or rear direction and a floor surface 6a.

A bench-shaped front seat 21 is installed in the front half of the cabin 6. The bench-shaped rear seat 22 of a folding type is installed in the rear half portion of the cabin 6. A dashboard (operating portion) 24 having a steering wheel 23 and the like is provided at the front end of the cabin 6.

FIG. 2 is a left side view of the pick-up style utility vehicle in the 4 passengers transformation. The bench-shaped front seat 21 has a seat leg 26 erected on the floor surface 6a of the cabin 6, a seat bottom 27 provided on the upper end face of the seat leg 26, and a backrest 29 fixed via a supporting stay on the intermediate longitudinal portion lid. The bench-shaped front seat 21 is typically extended in a right or left direction to near the right or left end of the cabin 6. With this configuration, two persons can be seated side by side. A driver can be seated on one of seating areas (left side) and a passenger can be seated on the other seating area. The bench-shaped rear seat 22 has a seat bottom 31 arranged on the upper side of a box 30 housing an engine (not shown), and a backrest 32 (the configuration will be described later in detail). As in the front seat 21, the seat bottom 31 and the backrest 32 are extended in a right or left direction to near the right or left end of the cabin 6. Therefore, two passengers can be seated side by side.

In FIG. 2, the folding configuration of the rear seat 22 will be described in detail. The seat bottom 31 is fixed onto the upper surface of a supporting base 40. The front end of the supporting base 40 is rotatably supported at the front upper end of the box 30 via a hinge 41. A pair of right and left stays 43 extended in a downward direction is fixed onto the backrest 32. The lower end of each of the stays 43 is rotatably coupled to the rear end of the seat bottom 31 via a hinge 45.

FIG. 3 shows a folding state of the rear seat 21. The backrest 32 is rotated about the hinge 45 so as to be brought into contact with the upper surface of the seat bottom 31. The seat bottom 31 is then rotated about the hinge 41 together with the backrest 32 so as to be substantially vertical. The rear seat 22 is folded in the retracted state of FIG. 3. The rear seat 22 is folded and retracted to use a rear portion riding space P1 as the forward expanded space of the cargo bed 9.

First Embodiment of the Present Invention

FIGS. 4 to 12 show the cargo bed of the pick-up style utility vehicle according to a first embodiment of the present invention, which is applied to the pick-up style utility vehicle shown in FIGS. 1 to 3. An appearance of the screen shield 10 has a slightly different shape.

Figure 4:
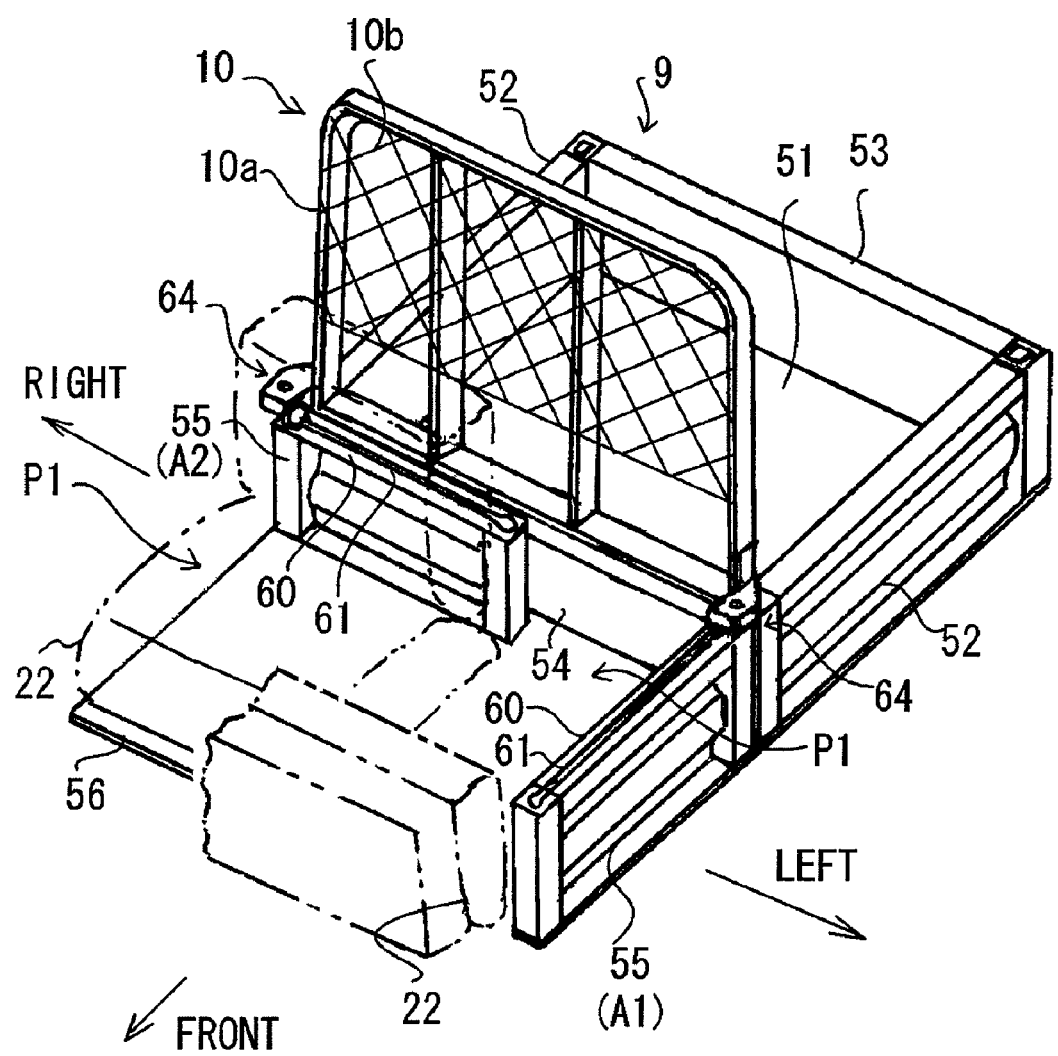
FIG. 4 is a perspective view of a cargo bed according to a first embodiment of the present invention.

FIG. 4 is a perspective view of a cargo bed 9 and a screen shield 10. The cargo bed 9 has, as a basic configuration, a stationary bottom plate 51, a pair of stationary side panels 52 provided substantially perpendicular to the stationary bottom plate 51 along the right and left ends of the stationary bottom plate 51, a gate type rear panel 53 provided at the rear end of the stationary bottom plate 51 so as to be opened and closed, and a front panel 54 integrally provided with the screen shield 10 and adjustable in a front or rear direction. In addition to these members, to expand the cargo bed 9 in a front direction, the cargo bed 9 has a pair of right and left expandable side panels 55 and an expandable bottom plate 56 extended in a front direction from the front end of the stationary bottom plate 51.

The expandable bottom plate 56 is integral with the stationary bottom plate 51 and is extended in a front direction on the same plane as that of the stationary bottom plate 51 from the front end of the stationary bottom plate 51 into a rear portion riding space P1. Each of the expandable side panels 55 is rotatably supported by a vertical hinge 50 (see FIG. 7) provided at the front end of the stationary side panel 52. Each of the expandable side panels 55 can be changed between an expanded position A1 where the expandable side panel 55 is extended in a front direction from the front end of the stationary side panel 52 (the state of the left expandable side panel 55) and a non-expanded position A2 extended to the inner side in a vehicle width direction from the front end of the stationary side panel 52 (the state of the right expandable side panel 55).

When the cargo bed 9 is not expanded, the rear seat 22 is brought into a used state (the right state). When the cargo bed 9 is expanded, the rear seat 22 is brought into a folded and retracted state (the left state).

The screen shield 10 has a metal frame 10a and a resin or metal net 10b provided in the frame 10a. In this embodiment, the screen shield 10 is integrally provided with the front panel 54 of the cargo bed 9 and is moved in a front or rear direction together with the front panel 54.

A configuration for slidably supporting the screen shield 10 will be described. The upper end face of each of the expandable side panels 55 is formed in a planar shape as a guide portion (guide rail surface) 60. A guide groove 61 extended along the length direction of the expandable side panel 55 is formed in the guide portion 60.

A slider 64 slidably mounted on the guide portion 60 is provided at the lower end of either end of the screen shield 10 in a vehicle width direction. The slider 64 is slid on the guide portion 60 of the expandable side panel 52 in the expanded position A1, thereby the screen shield 10 and the front panel 54 are integrally moved in a front or rear direction.

Figure 5:
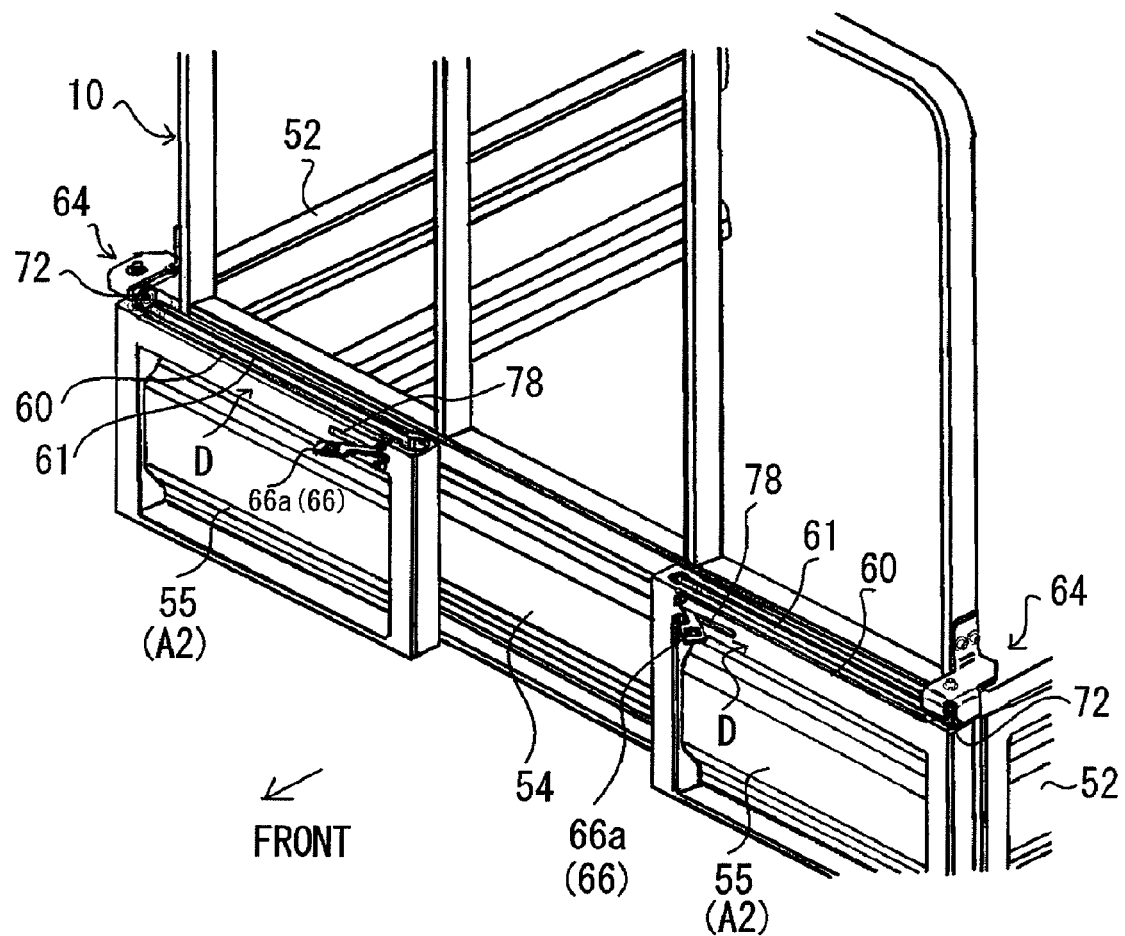
FIG. 5 is a perspective view of a front end of the cargo bed of FIG. 4 when the cargo bed is not expanded.

In FIG. 5 showing the front end of the non-expanded cargo bed 9, a lock lever 66 is provided at the end of each of the expandable side panels 55 to fix the slider 64 in the expanded position.

Figure 8:
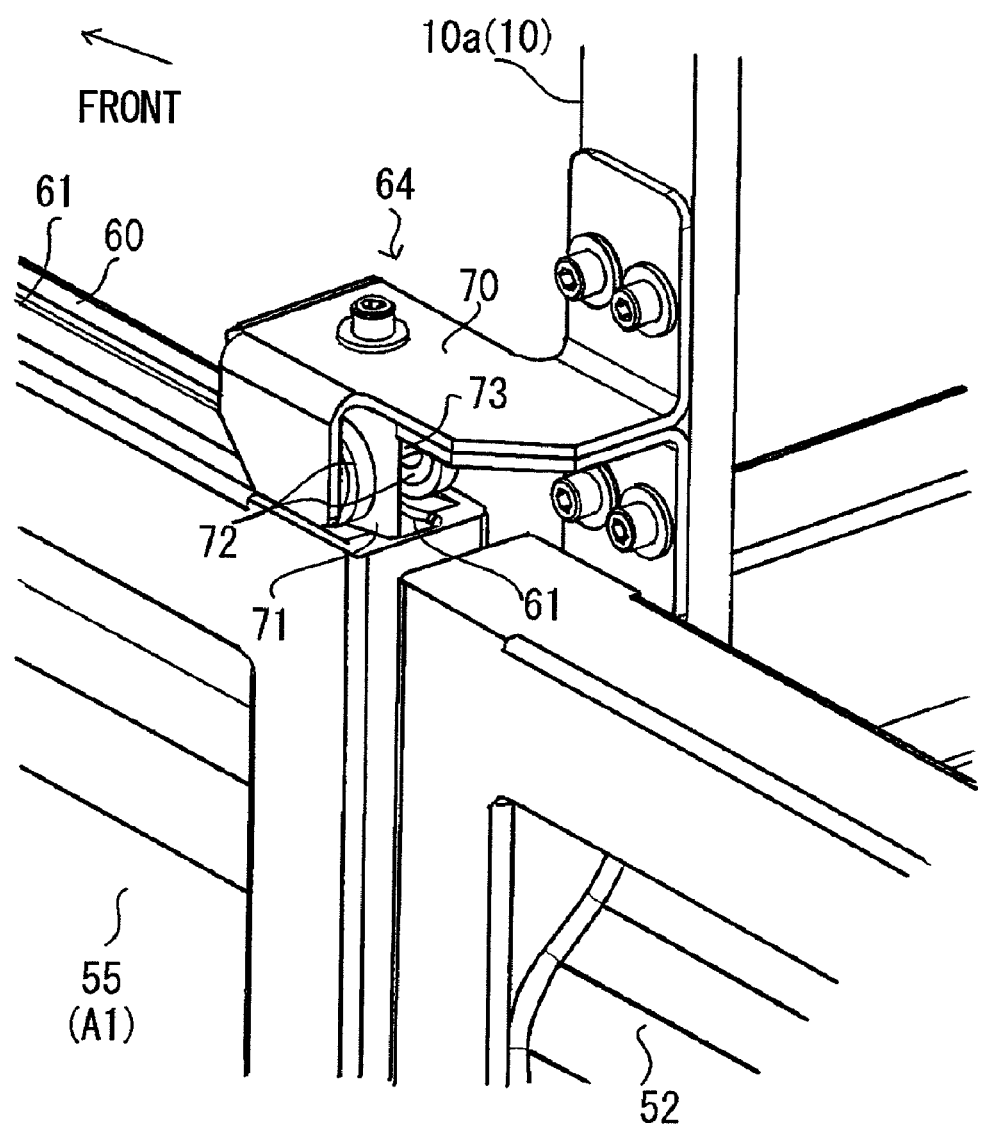
FIG. 8 is an enlarged perspective view of a slider of a screen shield of FIG. 4.
Figure 9:
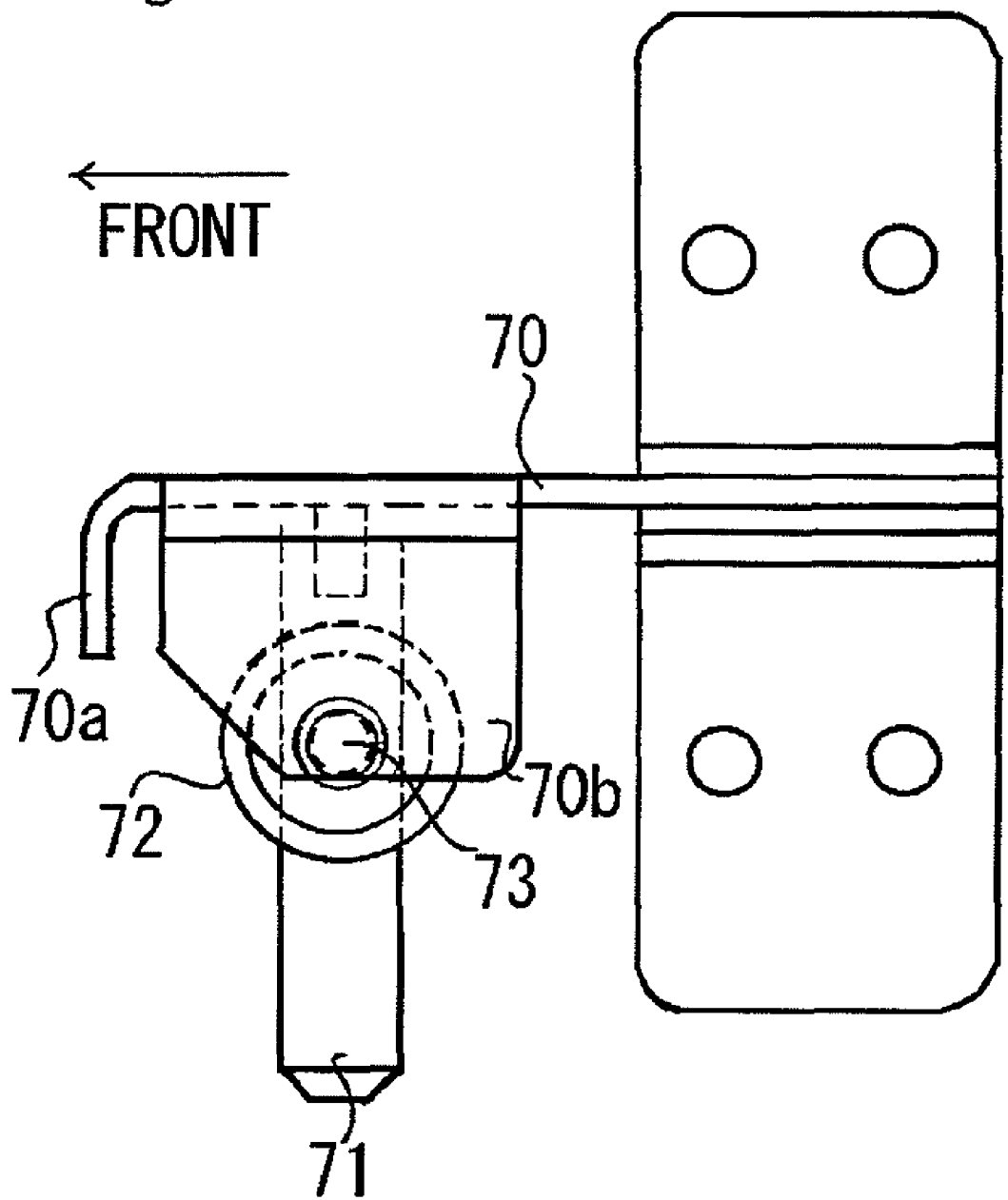
FIG. 9 is a side view of the slider of FIG. 8.
Figure 10:
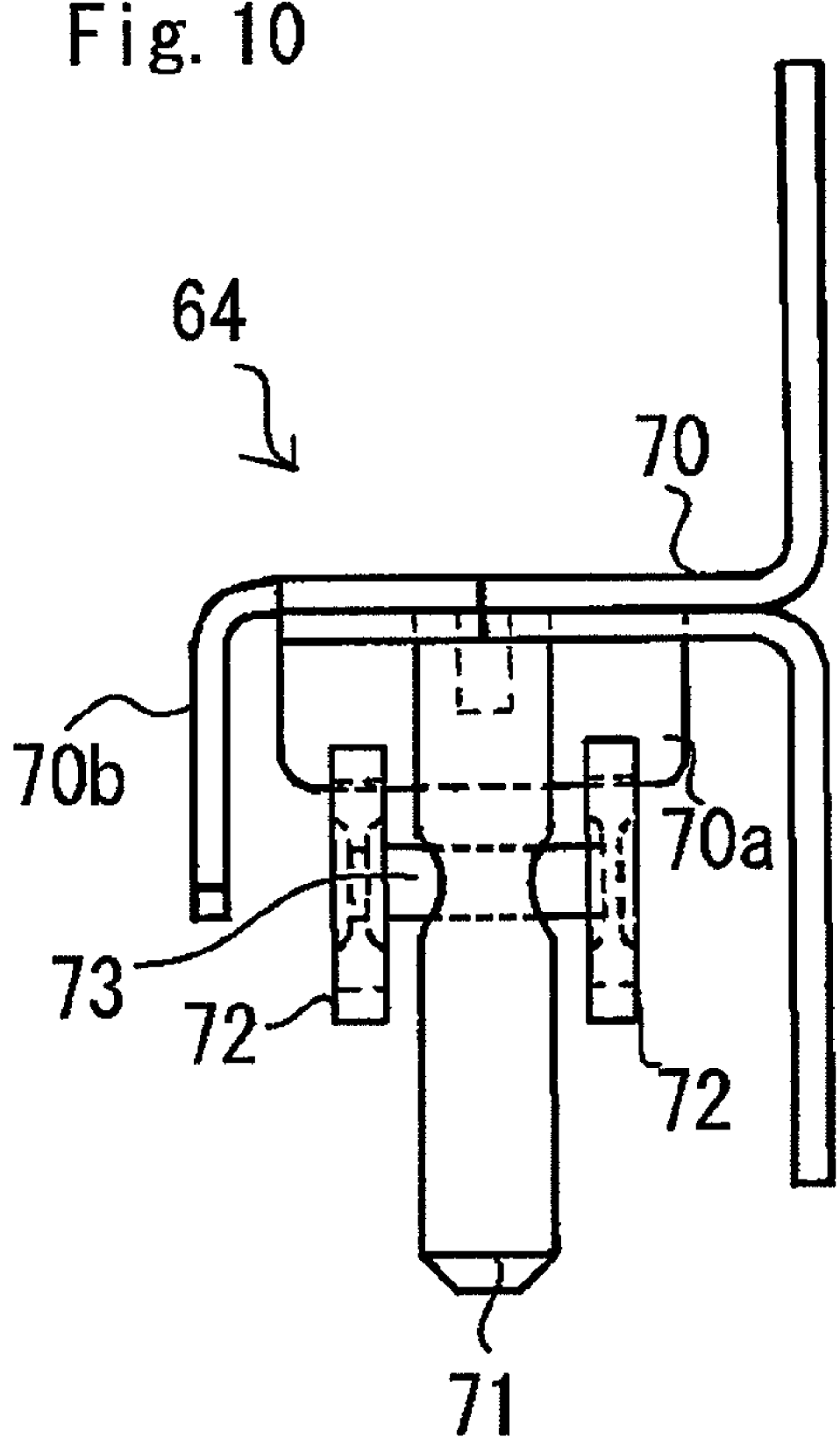
FIG. 10 is a front view of the slider of FIG. 8.

FIGS. 8 to 10 show the detail of the slider 64. In FIG. 8 which is a perspective view of the slider 64, the slider 64 has a bracket 70 fixed onto the frame 10a of the screen shield 10 and extended in a front direction, a guide pin 71 fixed onto the front end of the bracket 70 so as to be extended in a downward direction and protruded into the guide groove 61 of the expandable side panel 55, and a pair of rollers 72 rotatably supported by the guide pin 71 via a support shaft 73 and mounted on the guide portion 60.

In FIG. 9 which is a side view of the slider 64, the bracket 70 has a folding portion 70a covering the front side of the roller 72, and a folding portion 70b covering the side of the roller 72.

In FIG. 10 which is a rear surface view of the slider 64, the pair of rollers 72 are arranged on the right and left sides of the guide pin 71 and are supported at both ends of the support shaft 73.

Figure 11:
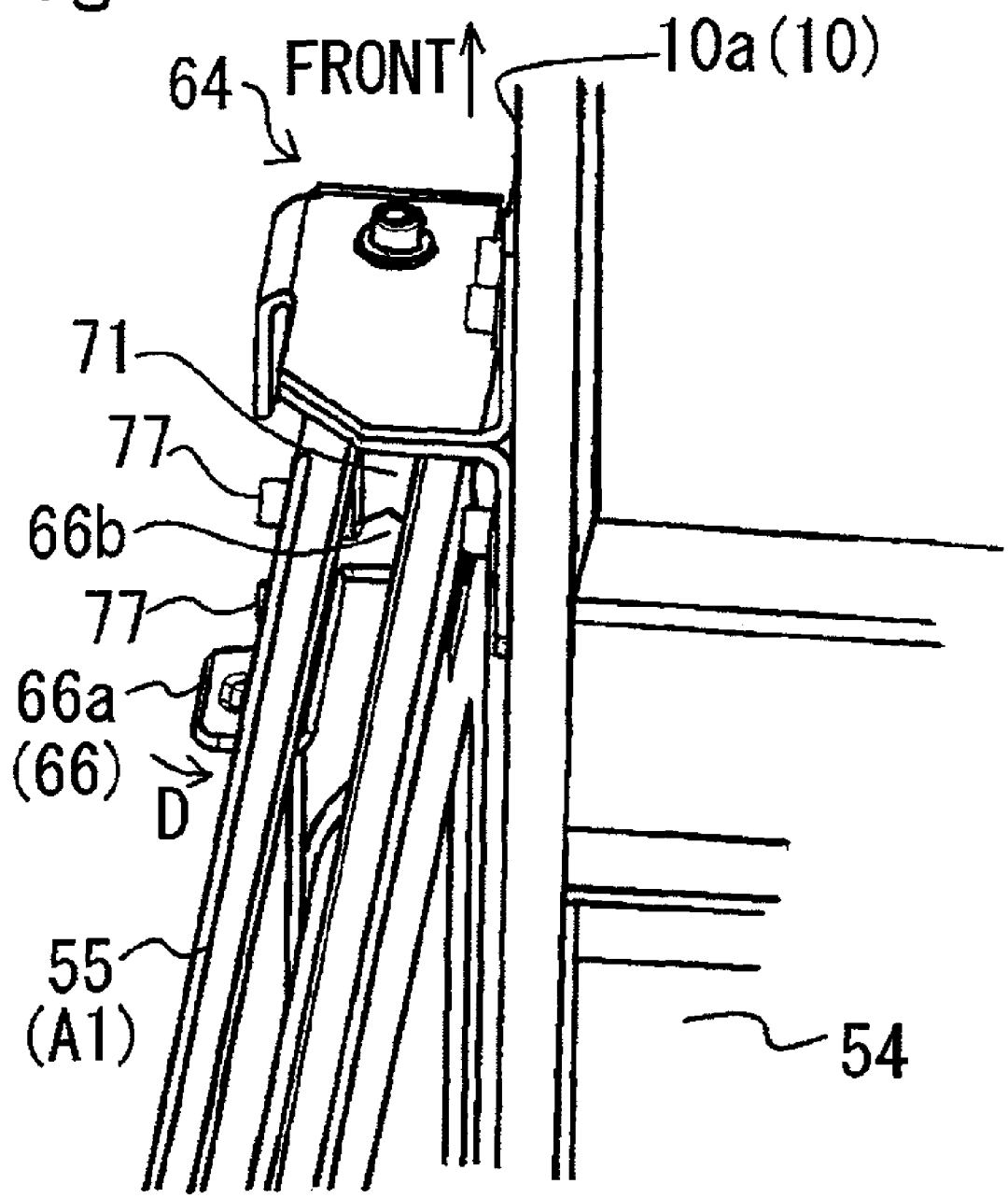
FIG. 11 is a perspective view of a lock lever locking the screen shield and the slider of FIG. 4.
Figure 12:
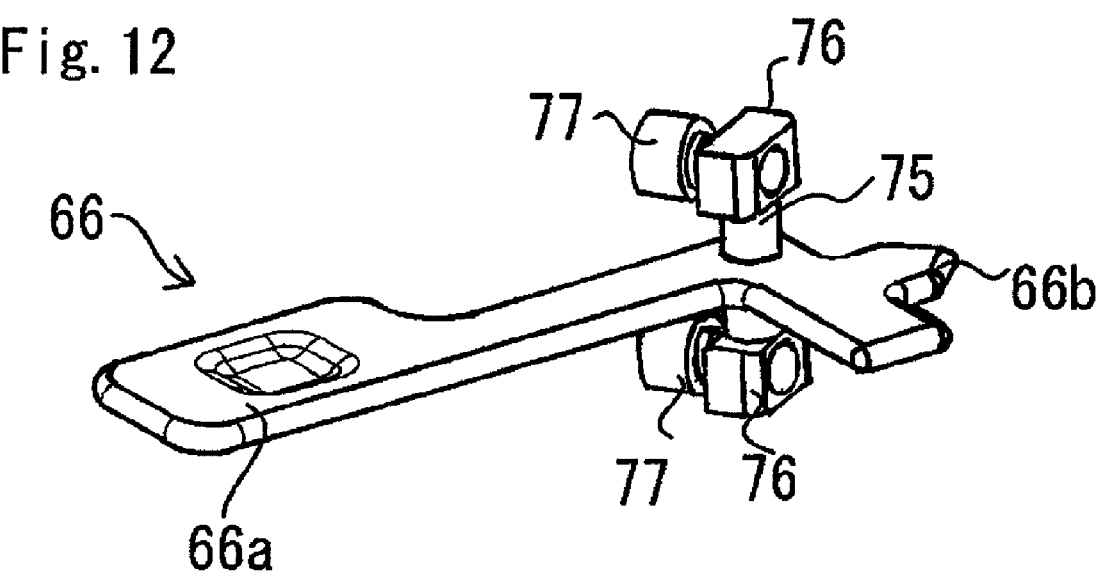
FIG. 12 is an enlarged perspective view of the lock lever of FIG. 11.

FIG. 11 is a perspective view of the lock lever 66 showing the state that the expandable side panel 55 is locked into the expanded position A1 and the slider 64. FIG. 12 is an enlarged perspective view of the lock lever 66. In FIG. 12, the lock lever 66 has one end provided with a gripping portion 66a, the other end provided with a pentagonal pressing portion 66b for engaging the guide pin 61 (see FIG. 11), and an intermediate portion provided with a lever shaft 75. The lever shaft 75 is extended in an up or downward direction, and the upper and lower ends of the lever shaft 75 are rotatably supported by a pair of supporting blocks 76. Each of the supporting blocks 76 has a bolt 77 for fixing the supporting block 76.

The pressing portion 66b, the lever shaft 75, and the supporting blocks 76 of the lock lever 66 are arranged in the expandable side panel 55 shown in FIG. 11. The supporting blocks 76 are fixed onto the expandable side panel 55 by the pair of bolts 77. As shown in FIG. 5, the gripping portion 66a of the lock lever 66 is protruded to the outside of the expandable side panel 55 through a slit 78 formed in the outline of the expandable side panel 55. As shown in FIG. 11, when the gripping portion 66a is rotated in an arrow D direction, the guide pin 71 of the slider 64 can be locked in the expanded position by the pressing portion 66b.

The expanding and contracting operations of the cargo bed 9 and the moving operation of the screen shield 10 will be described.

(1) When the cargo bed 9 is not expanded in 4 passengers transformation shown in FIG. 2, as shown in FIG. 5, the front panel 54 and the screen shield 10 are located in the non-expanded position corresponding to the front end of the stationary side panel 52. Each of the expandable side panels 55 is located in the non-expanded position A2 brought into contact with or close to the front surface of the front panel 54. The roller 72 of each of the sliders 64 is located at the outer end of each of the guide portions 60 in a vehicle width direction.

(2) In FIG. 4, the rear seat 22 is folded (the left state) and is retracted to make the rear portion riding space P1 empty.

Figure 6:
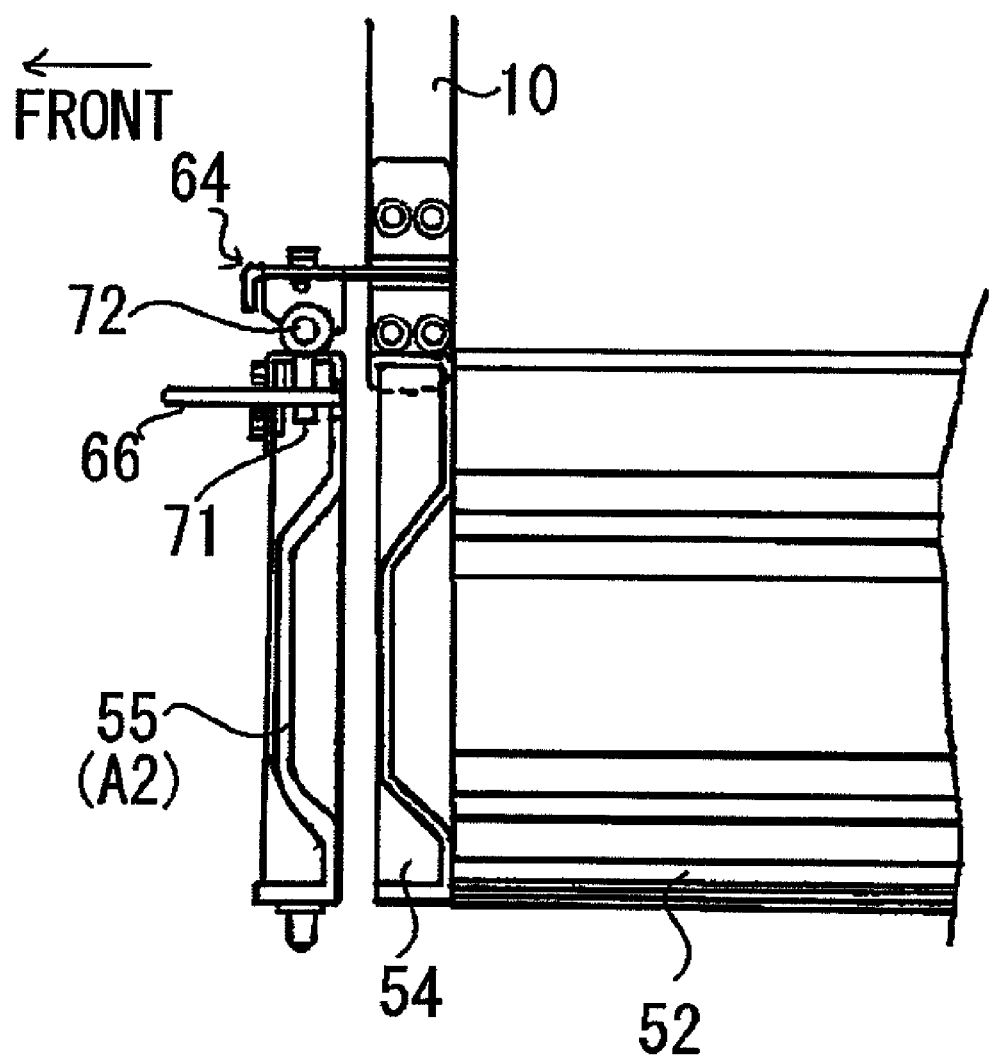
FIG. 6 is a longitudinal side view of the front end of the cargo bed of FIG. 4 when the cargo bed is not expanded.
Figure 7:
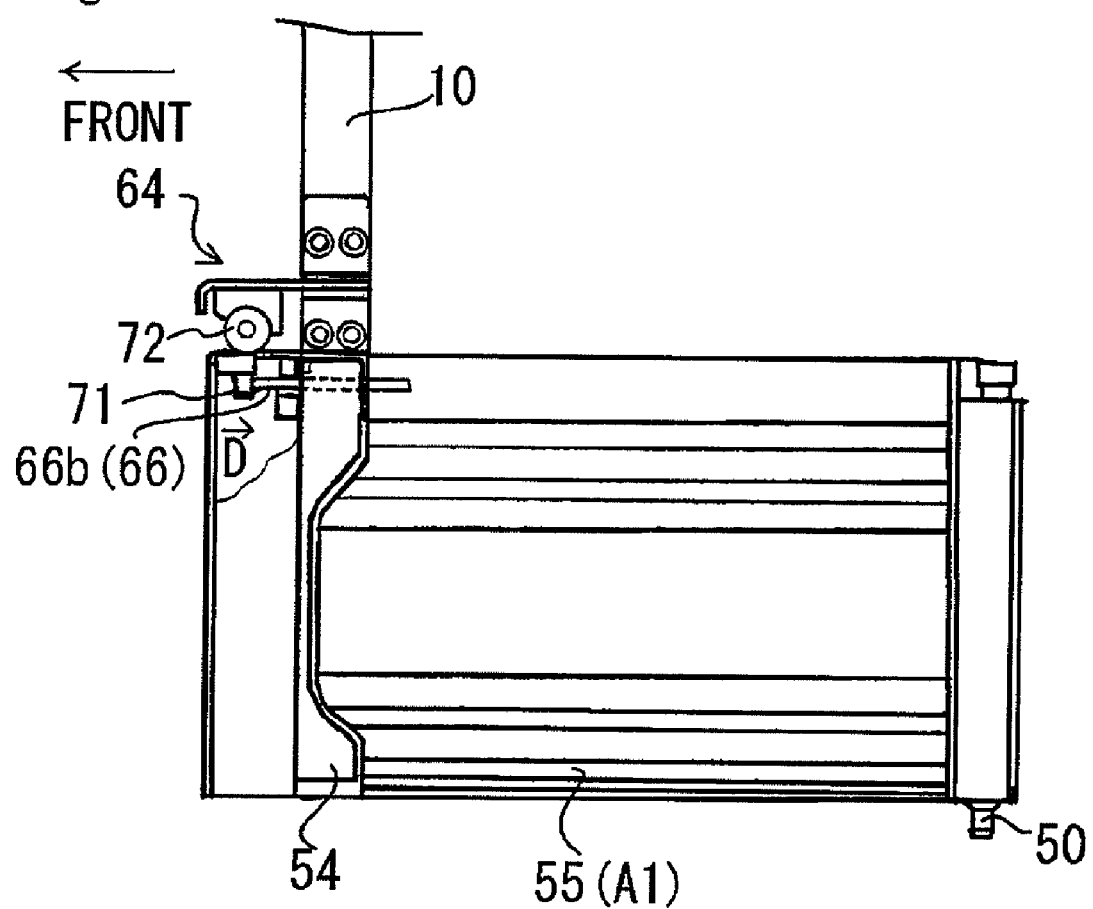
FIG. 7 is a longitudinal side view of the front end of the cargo bed of FIG. 4 when the cargo bed is expanded.

(3) The expandable side panels 55 are rotated about the hinges 50 from the non-expanded position A2 shown in FIGS. 5 and 6 to the expanded position A1 shown in FIG. 7.

(4) The screen shield 10 and the front panel 54 are integrally moved in a front direction. The roller 72 of each of the sliders 64 is rolled on each of the guide portions 60 of each of the expandable side panels 55 in the expanded position A1. The guide pin 71 is moved in the guide groove 61. The screen shield 10 and the front panel 54 are easily slidably moved from the non-expanded position A2 to the expanded position A1 by a small operation force of one operator. In addition, since the guide pin 71 is guided by the guide groove 61, the slider 64 cannot be moved off from the guide portion 60.

(5) In FIG. 11, the screen shield 10 and the front panel 54 are moved to the expanded position in a front direction to rotate the lock lever in an arrow DL direction, thereby engaging the guide pin 71 of the slider 64 by the pressing portion 66b of the lock lever 66. With this configuration, the screen shield 10 and the front panel 54 are fixed into the expanded position.

When the 2 passengers transformation is changed to the 4 passengers transformation and the cargo bed 9 is contracted into the non-expanded state, the expanding operation may be reversed. Also in this case, the roller 72 of each of the sliders 64 is rolled on the upper surface of each of the guide portions 60 of each of the expandable side panels 55 in the expanded position A1, and the guide pin 71 is moved in the guide groove 61. Thus, the screen shield 10 and the front panel 54 are easily slidably moved from the non-expanded position to the expanded position by a small operation force of one operator. Since the guide pin 71 is guided by the guide groove 61, the slider 64 cannot be moved off from the guide portion 60.

Second Embodiment

Figure 13:
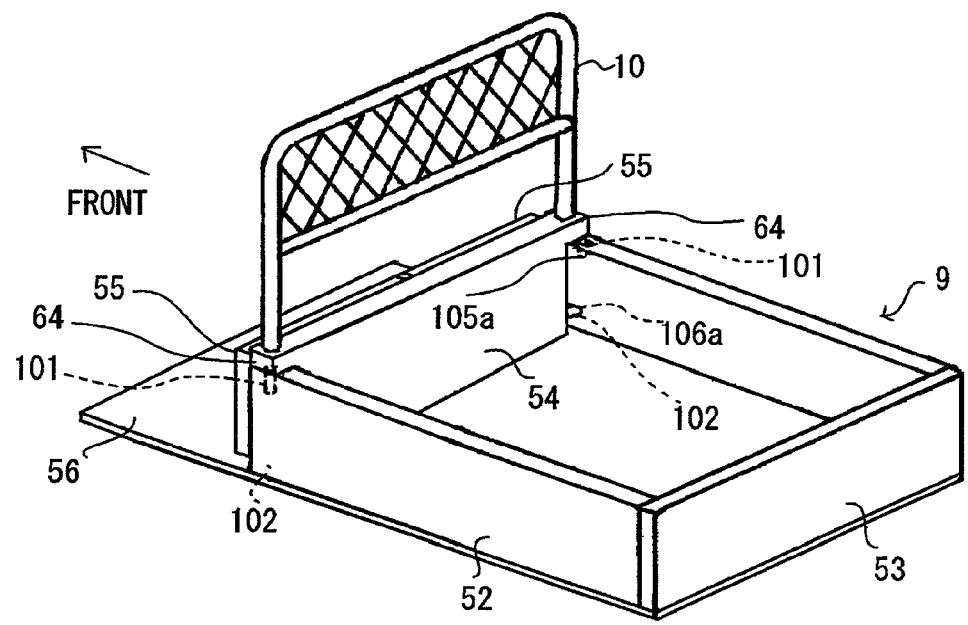
FIG. 13 is a perspective view of a cargo bed according to a second embodiment of the present invention when the cargo bed is not expanded.
Figure 15:
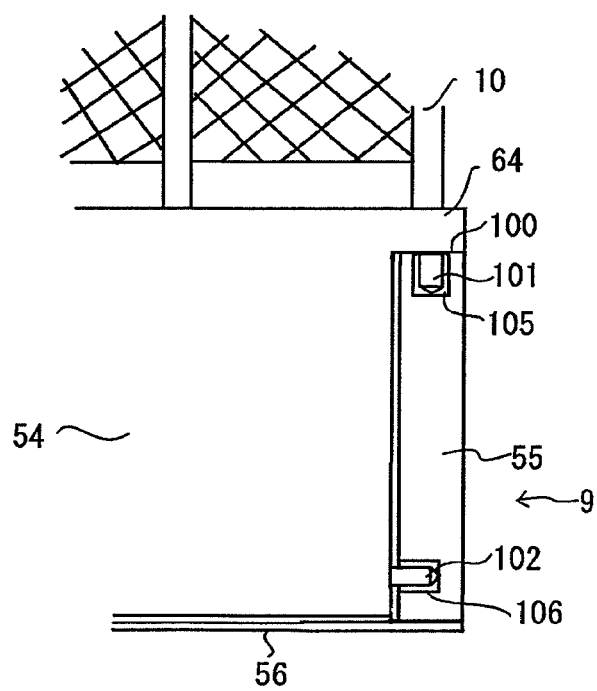
FIG. 15 is a cross-sectional view taken along line XV-XV of FIG. 14.
Figure 14:
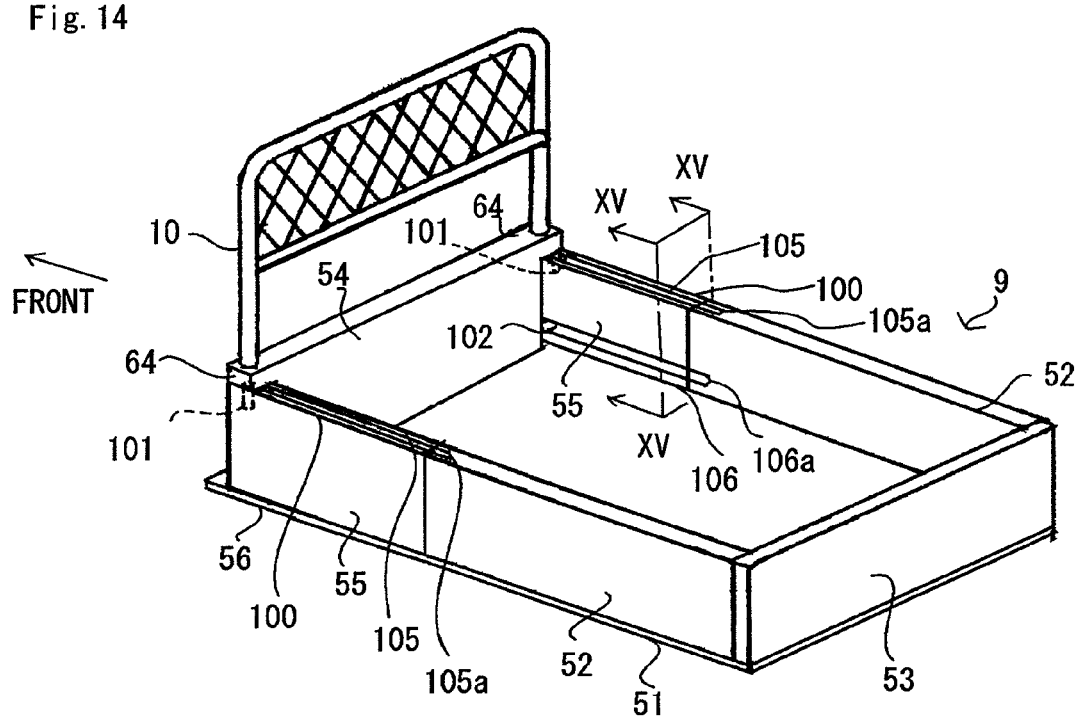
FIG. 14 is a perspective view of the cargo bed of FIG. 13 when the cargo bed is expanded.

FIGS. 13 to 15 show a second embodiment of the present invention, where FIG. 13 is a perspective view of the non-expanded cargo bed 9 and the screen shield 10, FIG. 14 is a perspective view of the expanded cargo bed 9 and the screen shield 10, and FIG. 15 is a cross-sectional view taken along line XV-XV of FIG. 14. The second embodiment has the same configuration as that of the first embodiment except that the following configuration is different. Like components are indicated by like reference numerals.

In FIG. 15, the sliders 64 protruded to the outer side in a vehicle width direction are formed at the lower ends of both ends of the screen shield 10 in a vehicle width direction. A first guide pin 101 protruded in a downward direction is provided on each of the sliders 64. Further, a second guide pin 102 protruded to the outer side in a vehicle width direction is provided at the lower end of either end of the front panel 54 in a vehicle width direction. The upper end face of the expandable side panel 55 is formed in a planar shape as a guide portion 100 for mounting the slider 64 thereon, and a first guide groove 105 that the first guide pin 101 engages is formed in the guide portion 100. Moreover, a second guide groove 106 that the second guide pin 102 movably engages is formed in the inner side surface of the expandable side panel 55 in a vehicle width direction. The first guide groove 105 and the second guide groove 106 are formed so as to be extended in a front or rear direction.

In FIG. 14, at the front end of each of the stationary side panels 52, there are formed a first guide recess portion 105a communicating with the rear end of the first guide groove 105 and a second guide recess portion 106a communicating with the rear end of the second guide groove 106. The slider 64 of the screen shield 10 is slidably mounted on the guide portion 100 of the expandable side panel 55 in a front or rear direction. Note that the roller of the first embodiment is not provided in the slider 64.

The expanding and contracting operations of the cargo bed 9 and the moving operation of the screen shield 10 are the same as those of the first embodiment.

FIG. 13, when the cargo bed 9 is not expanded, the screen shield 10 and the front panel 54 are located at the front end of the stationary side panel 52. The first guide pin 101 and the second guide pin 102 engage the first guide recess portion 105a and the second guide recess portion 106a of the stationary side panel 52, respectively.

When the cargo bed 9 is changed to the expanded state, the expandable side panels 55 are opened to the expanded position A1. Then, the screen shield 10 and the front panel 54 are slidably moved to the expanded position in a front direction shown in FIG. 14. While the screen shield 10 and the front panel 54 are moved, each of the sliders 64 of the screen shield 10 is slid on the guide portion 100 on the upper end face of the expandable side panel 55. The first guide pin 101 engages the first guide groove 105 to restrict the shifting of the screen shield 10 and the front panel 54 in a right or left direction. Further, the second guide pin 102 engages the second guide groove 106 to restrict the tilting of the screen shield 10 and the front panel 54 in a front or rear direction.

When the cargo bed 9 in the expanded state of FIG. 14 is contracted to the non-expanded state of FIG. 13, the expanding operation may be reversed.

Third Embodiment and Modification Example Thereof

Figure 16:
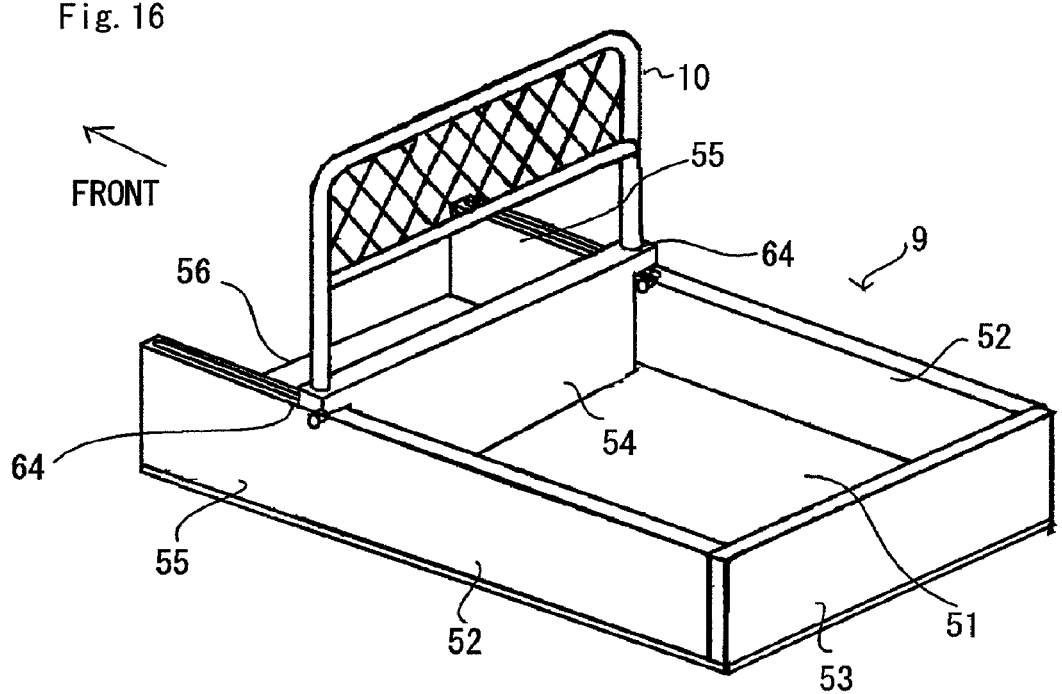
FIG. 16 is a perspective view of a cargo bed according to a third embodiment of the present invention when the cargo bed is not expanded.
Figure 18:
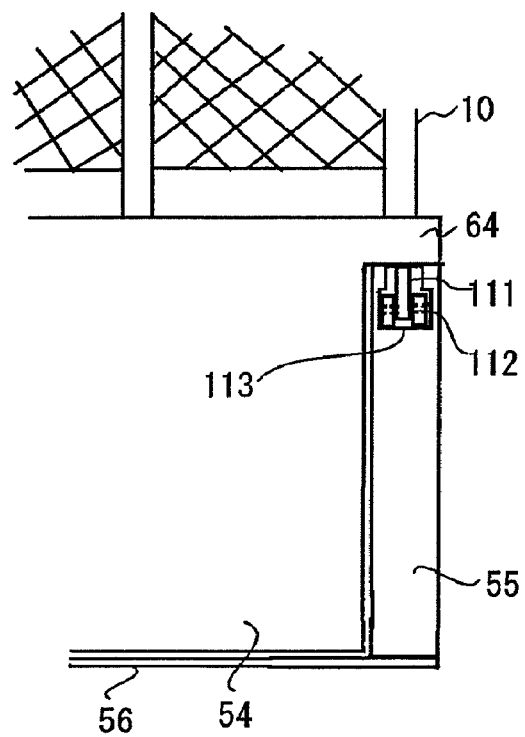
FIG. 18 is a cross-sectional view taken along line XVIII-XVIII of FIG. 17.
Figure 17:
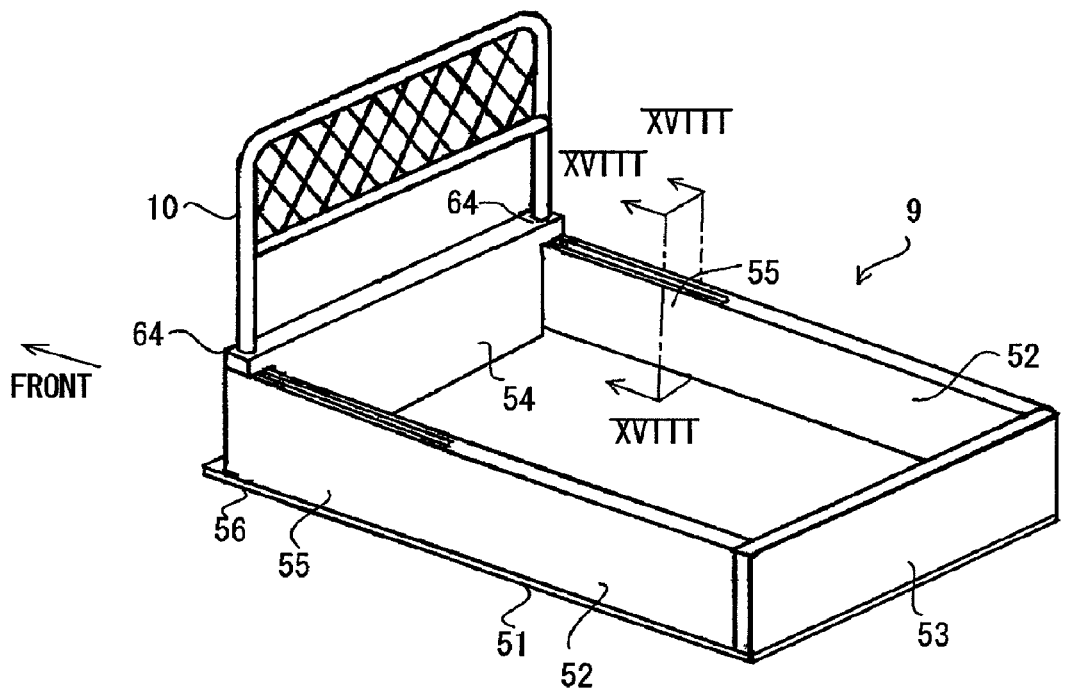
FIG. 17 is a perspective view of the cargo bed of FIG. 16 when the cargo bed is expanded.

FIGS. 16 to 18 show a third embodiment of the present invention, where FIG. 16 is a perspective view of the non-expanded cargo bed 9 and the screen shield 10, FIG. 17 is a perspective view of the expanded cargo bed 9 and the screen shield 10, and FIG. 18 is a cross-sectional view taken along line XVIII-XVIII of FIG. 17. The third embodiment has the same configuration as that of the first embodiment except that the following configurations (a) and (b) are different. Like components are indicated by like reference numerals.

(a) In FIG. 16, the expandable side panel 55 is integrally formed with the stationary side panel 52 and is extended in a front direction from the front end of the stationary side panel 52 at all times.

(b) In FIG. 18, each of the sliders 64 protruded to the outer side in a vehicle width direction is formed at the lower end of either end of the screen shield 10 in a vehicle width direction. A roller supporting member 111 protruded in a downward direction is provided on each of the sliders 64. A roller 112 is rotatably supported at the lower end of the roller supporting member 111. A groove-shaped guide portion (guide rail surface) 113 extended in a front or rear direction is formed in the upper end of the expandable side panel 55. The roller 112 of the slider 64 is mounted on the guide portion 113.

As shown in FIG. 16, when the cargo bed 9 is not expanded, the right and left expandable side panels 55 are protruded in a front direction from the stationary side panel 52. The expandable side panel 55 is used as an armrest for the rear seat.

In this embodiment, the expanding and contracting operations of the cargo bed 9 need not move the expandable side panel 55, and can be achieved only by moving the screen shield 10 and the front panel 54 on the guide portion 113 via the slider 64 in a front or rear direction.

According to the third embodiment, the roller 112 is provided in the slider 64. The operation force for moving the screen shield 10 becomes small. In addition, since the roller 112 is retracted in the groove, the roller 112 cannot be moved off from the guide portion 113 during movement.

Figure 19:
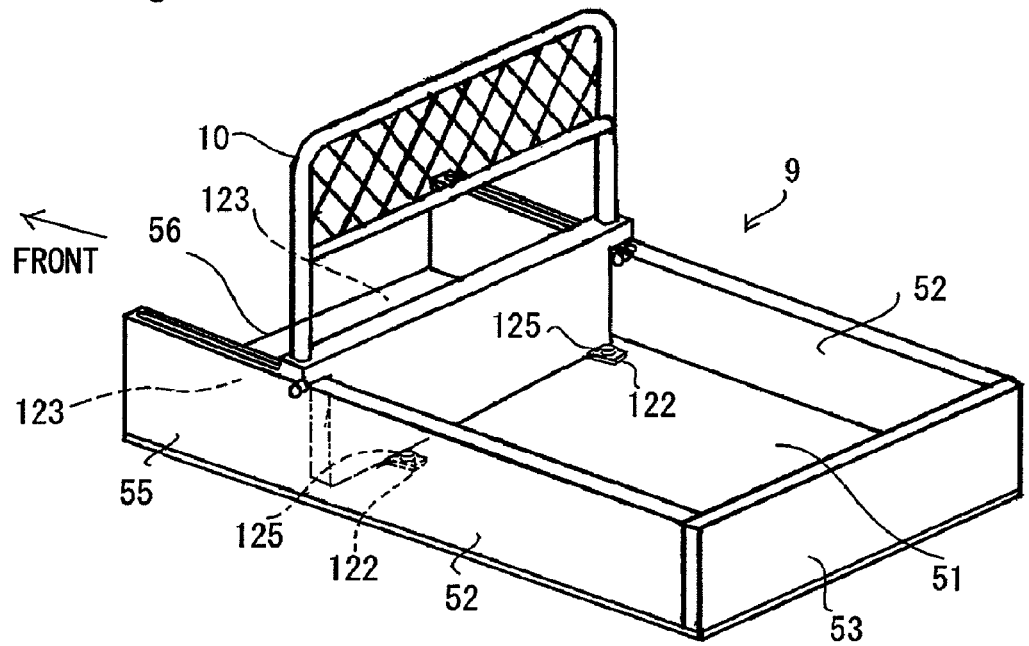
FIG. 19 is a perspective view of a modification example of the cargo bed according to the third embodiment of the present invention when the cargo bed is not expanded.
Figure 21:
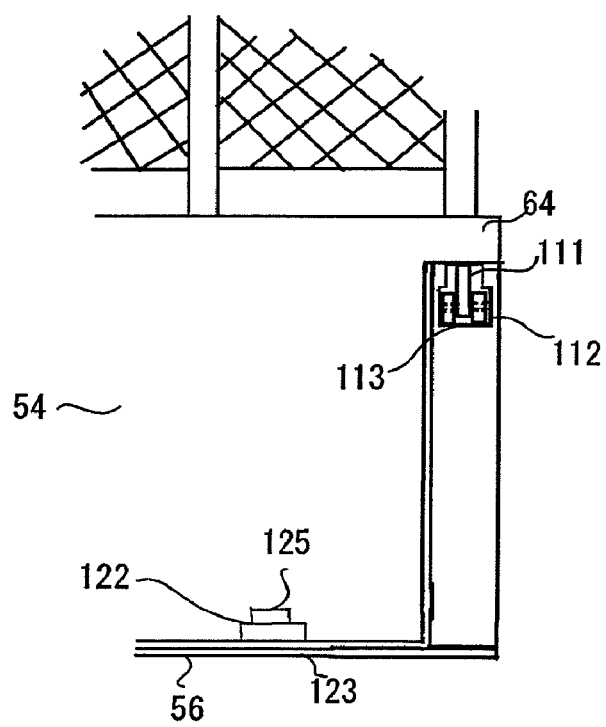
FIG. 21 is a cross-sectional view taken along line XXI-XXI of FIG. 20.
Figure 20:
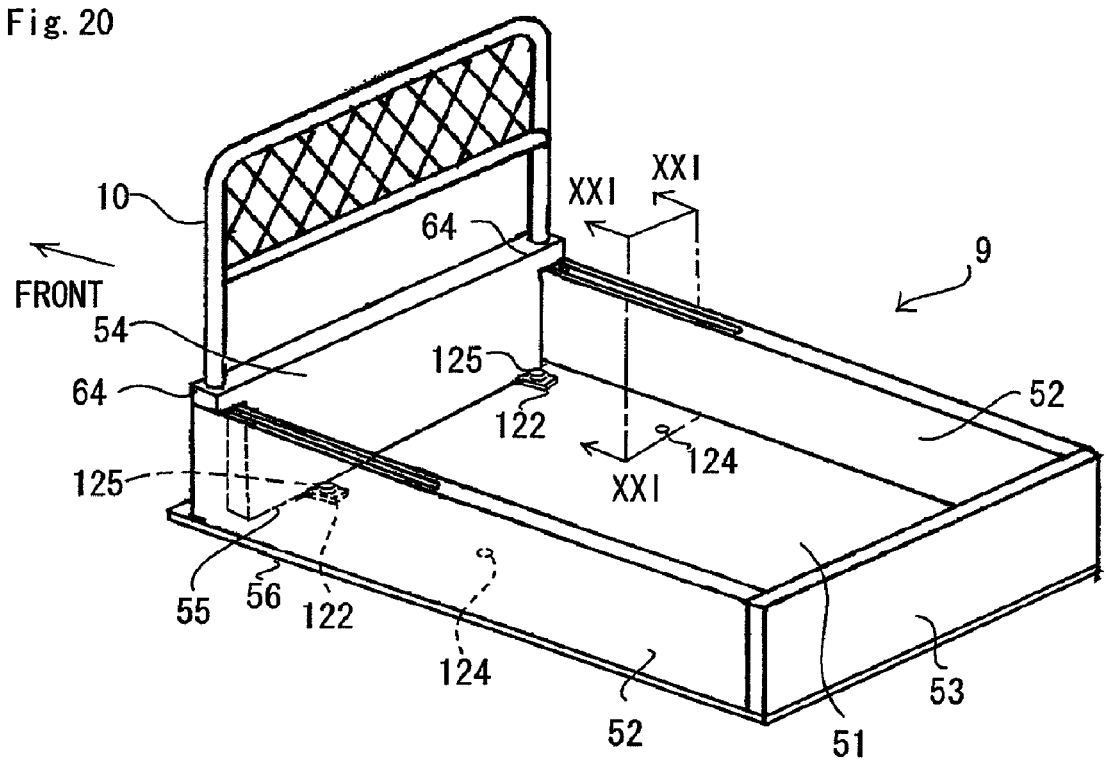
FIG. 20 is a perspective view of the cargo bed of FIG. 19 when the cargo bed is expanded.

FIGS. 19 and 21 show a modification example of the third embodiment of the present invention, where FIG. 19 is a perspective view of the non-expanded cargo bed 9 and the screen shield 10, FIG. 20 is a perspective view of the expanded cargo bed 9 and the screen shield 10, and FIG. 21 is a cross-sectional view taken along line XXI-XXI of FIG. 20. In addition to the configuration of the third embodiment (the configuration of FIGS. 16 to 18), the modification example has the same configuration of that of the third embodiment except that a lock mechanism is provided to fix the screen shield 10 and the front panel 54 in the expanded position and the non-expanded position.

In FIG. 21, the lock mechanism has a pair of lock sections 122 provided at the lower ends of the front panel 54 and having a pin hole, a pair of positioning holes 123 provided at the front ends of the expandable bottom plate 56, lock pins 125 inserted into the lock sections 122 and the positioning holes 123, and a pair of positioning holes 124 provided at the front ends of the stationary bottom plate 51 (FIG. 20).

In FIG. 19, when the cargo bed 9 is not expanded, the lock pins 125 are inserted into the pin holes of the lock sections 122 and the positioning holes 124 (FIG. 20) at the front end of the stationary bottom plate 51 to lock the screen shield 10 and the front panel 54. In FIG. 20, when the cargo bed 9 is expanded, the lock pins 125 are inserted into the pin holes of the lock sections 122 and the positioning holes 123 (FIGS. 19 and 21) at the front end of the expandable bottom plate 56 to lock the screen shield 10 and the front panel 54.

Fourth Embodiment

Figure 22:
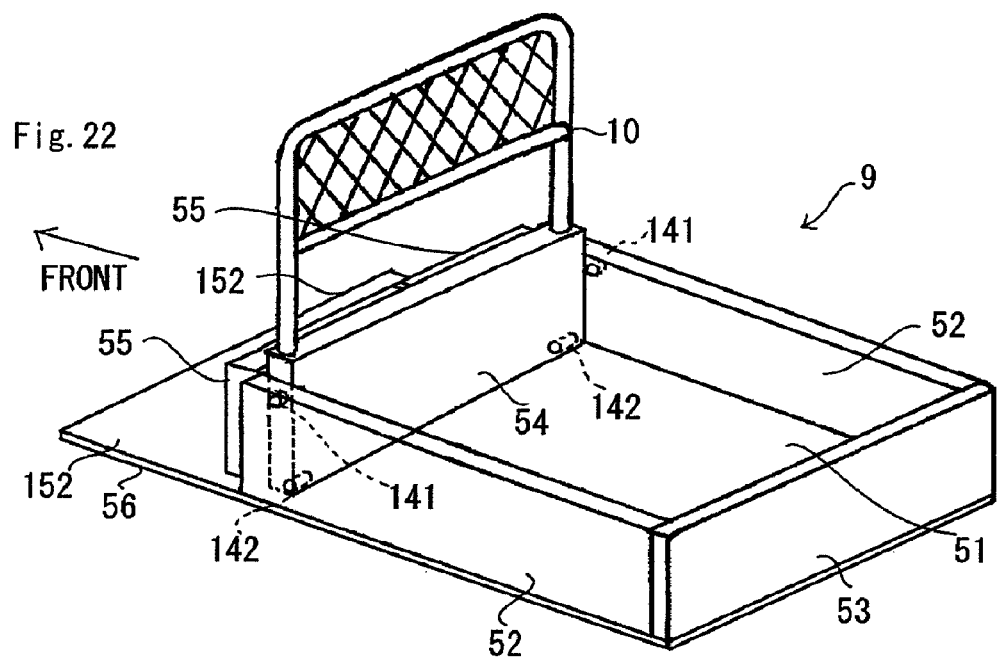
FIG. 22 is a perspective view of a cargo bed according to a fourth embodiment of the present invention when the cargo bed is not expanded.
Figure 24:
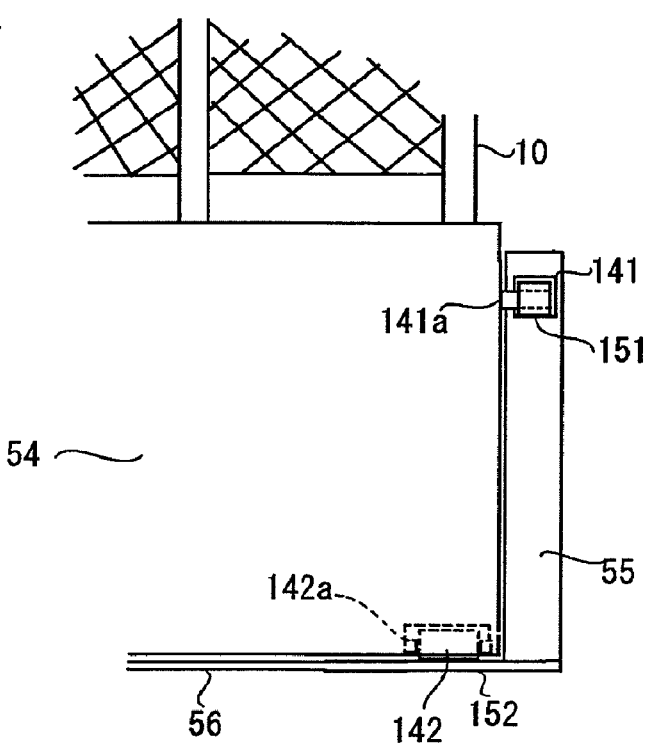
FIG. 24 is a cross-sectional view taken along line XXIV-XXIV of FIG. 23.
Figure 23:
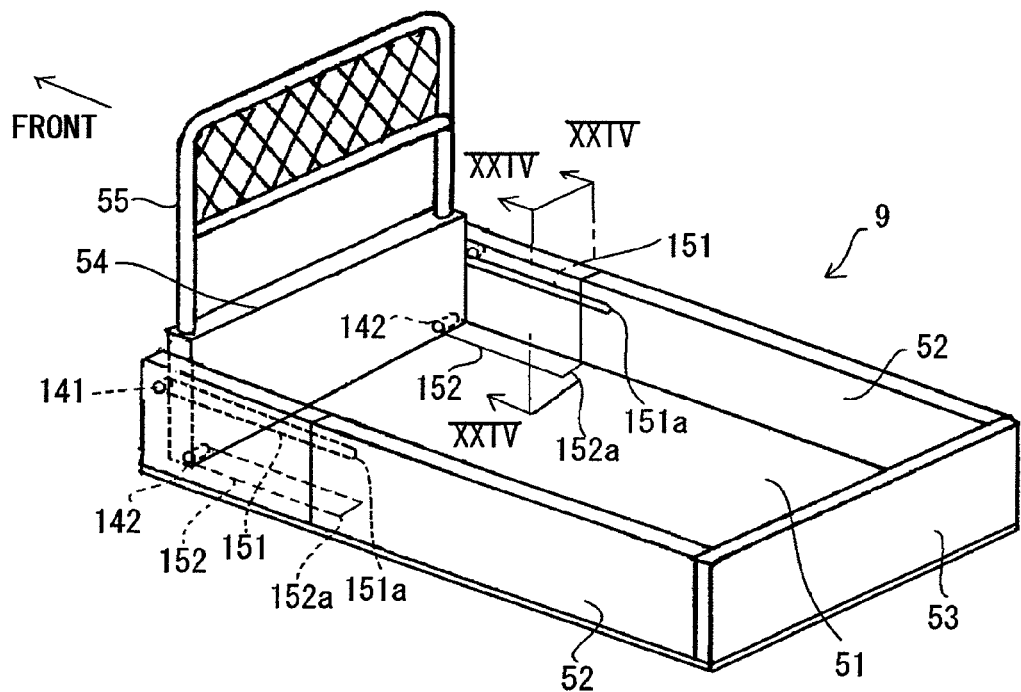
FIG. 23 is a perspective view of the cargo bed of FIG. 22 when the cargo bed is expanded.

FIGS. 22 to 24 show a fourth embodiment of the present invention, where FIG. 22 is a perspective view of the non-expanded cargo bed 9 and the screen shield 10, FIG. 23 is a perspective view of the expanded cargo bed 9 and the screen shield 10, and FIG. 24 is a cross-sectional view taken along line XXIV-XXIV of FIG. 23. The fourth embodiment has the same configuration as that of the first embodiment except that the following configuration is different. Like components are indicated by like reference numerals.

In FIG. 24, a first roller 141 and a second roller 142 are rotatably provided as sliders at the upper end and the lower end of both ends of the front panel 54 in a vehicle width direction. The both rollers 141 and 142 are rotatably supported by the front panel 54 by horizontal roller shafts 141a and 142a, respectively. The both rollers 141 and 142 are rotatably mounted on a first guide portion 151 provided at the upper end of the expandable side panel 55 and formed in a groove shape and a second guide portion 152 provided on the expandable bottom plate 56, respectively. The guide portions 151 and 152 are extended in a front or rear direction.

In FIG. 23, a first guide recess portion 151a communicating with the rear end of the first guide portion 151 is formed at the front end of each of the stationary side panels 52, and a second guide portion 152a communicating with the rear end of the second guide portion 152 is formed at the front end of the stationary bottom plate 51.

The expanding and contracting operations of the cargo bed and the moving operation of the screen shield are the same as those of the first and second embodiments.

Fifth Embodiment

Figure 25:
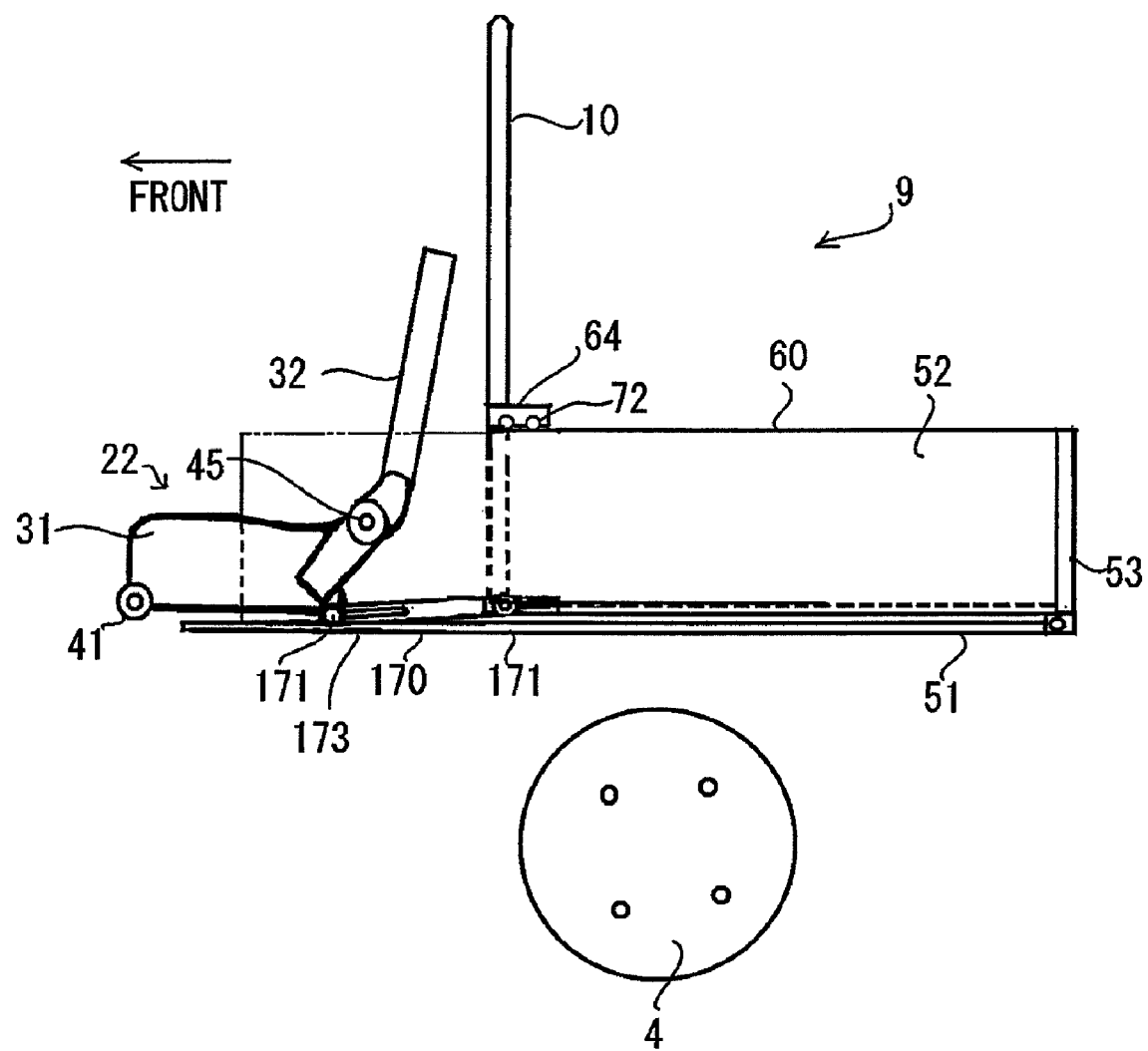
FIG. 25 is a side view of a modification example of a cargo bed according to a fifth embodiment of the present invention when the cargo bed is not expanded.
Figure 26:
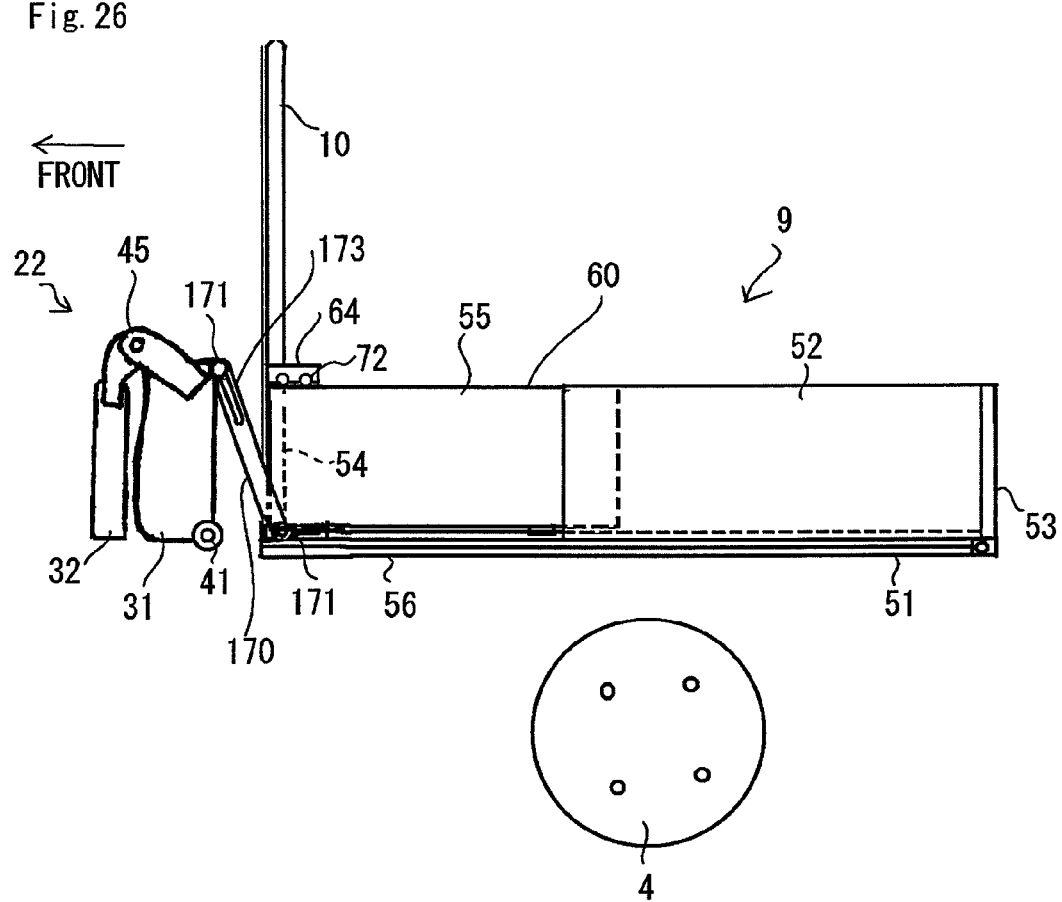
FIG. 26 is a side view of the cargo bed of FIG. 25 when the cargo bed is expanded.

FIGS. 25 and 26 show a modification example of the first embodiment of the present invention, where FIG. 25 is a side view of the rear seat 22 in the used state, the non-expanded cargo bed 9, and the screen shield 10, and FIG. 26 is a side view of the rear seat 22 in the retracted state, the expanded cargo bed 9, and the screen shield 10. The modification example has the same configuration as that of the third embodiment except that basically, an interlocking mechanism of the rear sear 22, the screen shield 9, and the front panel 54 is added to the configuration of the third embodiment. Like components are indicated by like reference numerals.

In FIG. 26, the expandable side panel 55 of the cargo bed 9 is integrally formed with the stationary side panel 52, and the expandable bottom plate 56 is integrally formed with the stationary bottom plate 51. The roller 72 is provided in the slider 64 provided on the screen shield 10 and the front panel 54, and the roller 72 is mounted on the guide portion 60 provided on the upper end face of the expandable side panel 55.

Either end in a vehicle width direction at the lower end of the front panel 54 is coupled to the rear end of the seat bottom 31 of the rear seat 22 via a link 170 and front and rear hinge pins 171. The front hinge pin 171 engages an elongated hole 173 formed at the front end of the link 170. The link 170 is arranged inside the expandable side panel 55 in a vehicle width direction.

According to the fifth embodiment, as shown in FIG. 26, the rear seat 22 is folded and retracted. The screen shield 10 and the front panel 54 are automatically moved in a front direction to the expanded position via the link 170. As shown in FIG. 25, the rear seat 22 is brought into the used state, thereby the screen shield 10 and the front panel 54 are automatically moved in a rear direction to the non-expanded position.

According to the fifth embodiment, the guide portion 60 can be provided in the expandable side panel 55, as in the fourth embodiment (FIG. 20).

Sixth Embodiment

Figure 27:
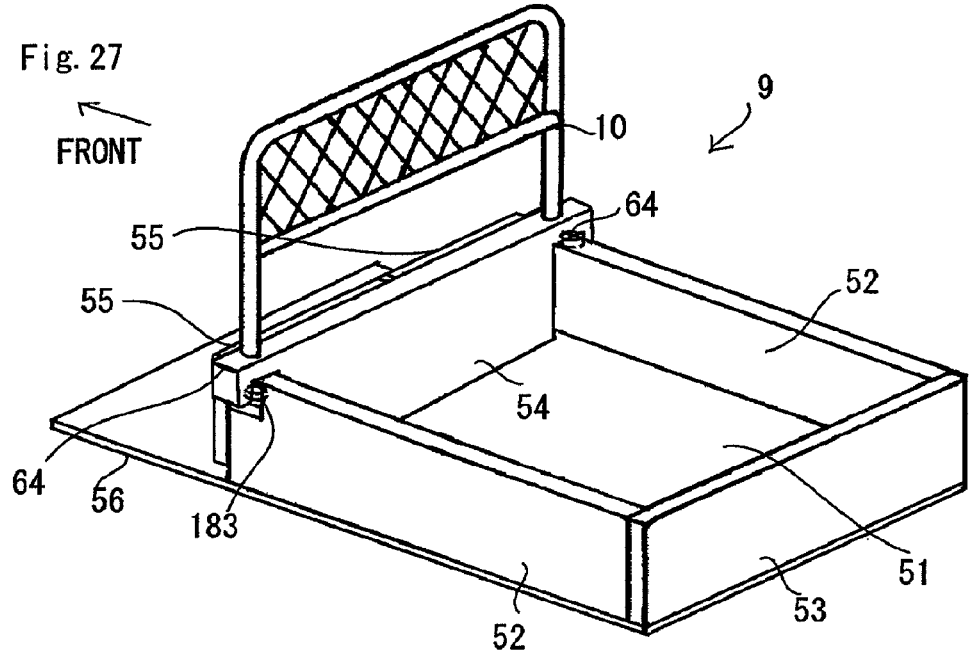
FIG. 27 is a perspective view of a cargo bed according to a sixth embodiment of the present invention when the cargo bed is not expanded.
Figure 29:
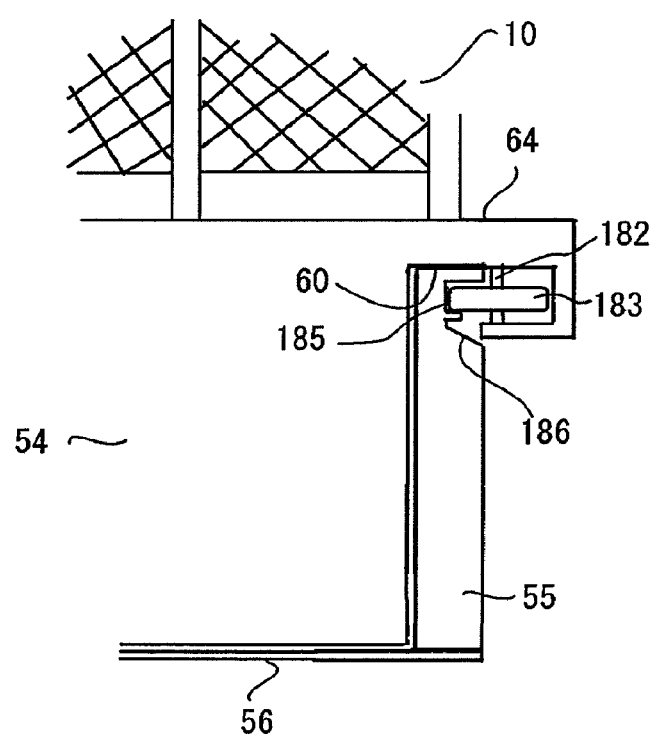
FIG. 29 is a cross-sectional view taken along line XXIX-XXIX of FIG. 28.

FIGS. 27 to 29 show a sixth embodiment of the present invention, where FIG. 27 is a perspective view of the non-expanded cargo bed 9 and the screen shield 10, FIG. 28 is a perspective view of the expanded cargo bed 9 and the screen shield 10, and FIG. 29 is a cross-sectional view taken along line XXIX-XXIX of FIG. 28. The sixth embodiment has the same configuration as that of the first embodiment except that the following configuration is different. Like components are indicated by like reference numerals.

In FIG. 29, each of the sliders 64 protruded outward in a vehicle width direction is formed at the lower end of either end in a vehicle width direction of the screen shield 10. A roller 183 is rotatably supported by the slider 64 via a vertical support shaft 182 on the outer side of the expandable side panel 55 in a vehicle width direction. The first guide portion 60 on which the lower surface of the slider 64 is slidably mounted is formed in a planar shape on the upper end face of the expandable side panel 55. On the outer side surface of the expandable side panel 55 in a vehicle width direction, formed is a second guide portion 185 abutted by the roller 183, laterally opened, and having a recess shape. The second guide portion 185 is extended in a front or rear direction, and at the lower end of the second guide portion 185, an inclined surface 186 inclined in a downward direction and outward in a vehicle width direction is formed.

The expanding and contracting operations of the cargo bed 9 and the moving operation of the screen shield are the same as those of the first and second embodiments.

According to the sixth embodiment, the expandable side panels 55 are slid by being nipped by the pair of rollers 183 arranged spaced apart in a vehicle width direction from the outer side in a vehicle width direction. Therefore, while the screen shield 10 and the front panel 54 are moved, the rattling of the screen shield in a right or left direction can be prevented. Moreover, since the inclined surface 186 is formed on the lower side of the second guide portion 185 formed on the outer side surface of the expandable side panel 55 in a vehicle width direction, any soils and dust cannot be accumulated on the second guide portion 185 in a recess shape. Thus, the smooth movement of the roller 183 can be secured.

Seventh Embodiment

Figure 31:
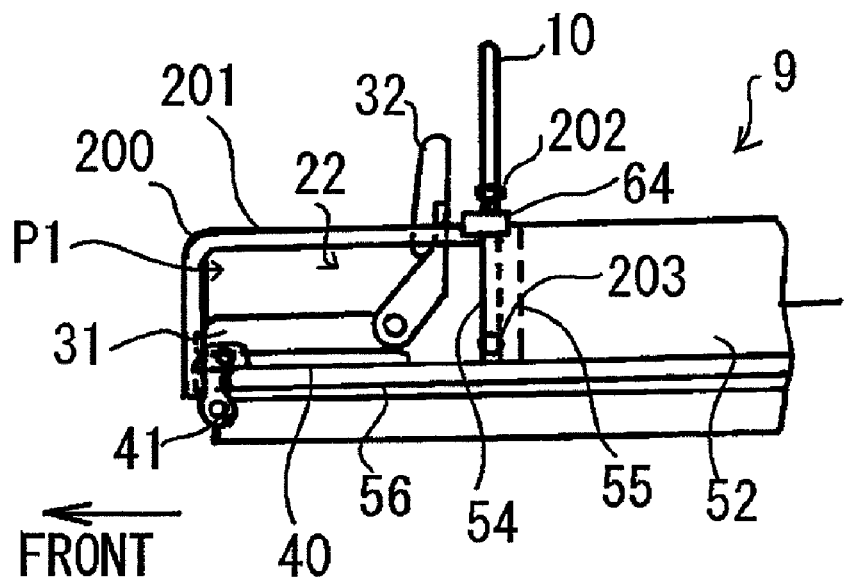
FIG. 31 is a side view of FIG. 30.
Figure 32:
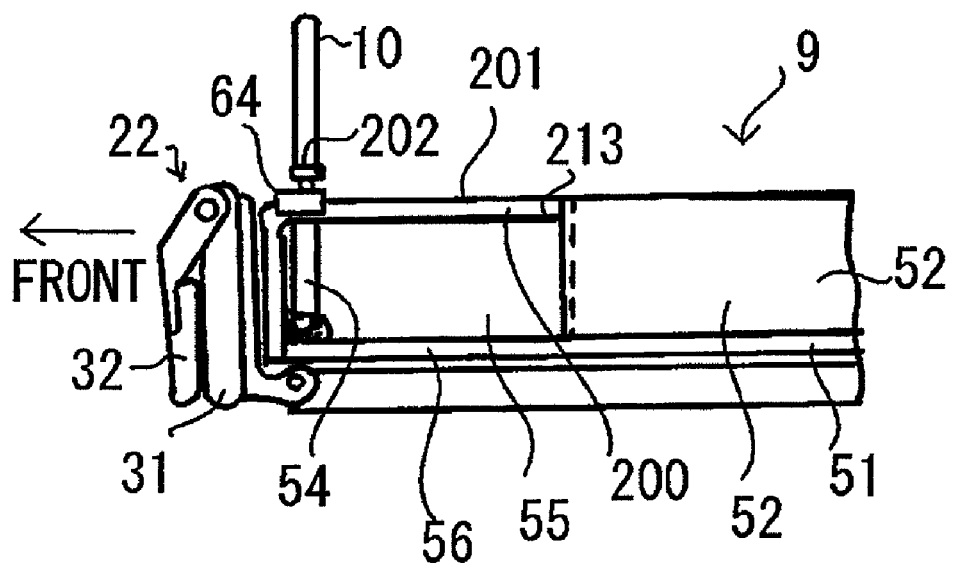
FIG. 32 is a perspective view of the cargo bed of FIG. 31 when the cargo bed is expanded.

FIGS. 30 to 32 show a seventh embodiment of the present invention, where FIG. 30 is a plan view of the rear seat 22 in the used state, the non-expanded cargo bed 9, and the screen shield 10, FIG. 31 is a side view of FIG. 30, and FIG. 32 is a side view of the rear seat 22 in the retracted state, the expanded cargo bed 9, and the screen shield 10. The seventh embodiment has the same configuration as that of the first embodiment except that the following configurations (a), (b), and (c) are different. Like components are indicated by like reference numerals.

(a) In FIG. 30, the pair of expandable side panels 55 are rotatably coupled to the rear surface of the front panel 54 via hinges 210 and are opened in arrow E directions relative to the front panel 54.

(b) In FIG. 31, an armrest 200 for the expandable side panel formed in an inverted L shape and serving as a stopper is provided at either end of the expandable bottom plate 56 in a vehicle width direction. The upper surface of the armrest 200 serves as a guide portion 201. The armrest 200 is formed so as to have a size substantially corresponding to the outer shape of the expandable side panel 55, seen from the side, and when the expandable side panel 55 is opened to the expanded position, as shown in FIG. 32, functions as a positioning stopper engaging the expandable side panel 55 in the expanded position.

(c) In FIG. 30, each of the sliders 64 engaging the guide portion 201 of the armrest 200 so as to be movable in a front or rear direction is provided at either end of the screen shield 10 in a vehicle width direction. The slider 64 is formed, for example, in a U shape opened in a downward direction, seen from the rear side. Lock pins 202 and 203 are provided in the upper panel and the side panel of the slider 64. On the other hand, positioning holes 208 and 213 (see FIG. 31) into which the lock pins 202 and 203 can be inserted are formed in the corresponding expanded position and the non-expanded position of the slider 64 in the guide portion 201 of the armrest 200. Further, a stopper 212 for engaging and fixing the expandable side panel 55 in the non-expanded position is provided on the rear surface of the front panel 54.

When the cargo bed 9 is changed from the non-expanded state of FIG. 31 to the expanded state of FIG. 32, the lock pins 202 and 203 are released to integrally move the front panel 54 and the screen shield 10 in a front direction. The slider 64 is slidably moved in a front direction along the guide portion 201 of the armrest 200. After the front panel 54 and the screen shield 10 are moved to the expanded position, the expandable side panels 55 are opened in the arrow E directions of FIG. 30 and, as shown in FIG. 32, engage the armrest 200 so as to engage into the expanded position. The expandable side panels 55 are locked in the expanded position by the lock pins 202 and 203.

When the cargo bed 9 is changed from the expanded state of FIG. 32 to the non-expanded state of FIG. 31, the lock pins 202 and 203 are released to close the expandable side panels 55, and the front panel 54 and the screen shield 10 are integrally moved in a rear direction. After the front panel 54 and the screen shield 10 are moved to the non-expanded position, the expandable side panels 55 are locked in the non-expanded position by the lock pins 202 and 203.

In the 4 passengers transformation as shown in FIG. 31, the armrest 200 is used as the arm rest for the rear seat 22. In the 2 passengers transformation as shown in FIG. 32, the armrest 200 is used as the stopper for positioning the expandable side panel 55 in the expanded position.

Eighth Embodiment

Figure 33:
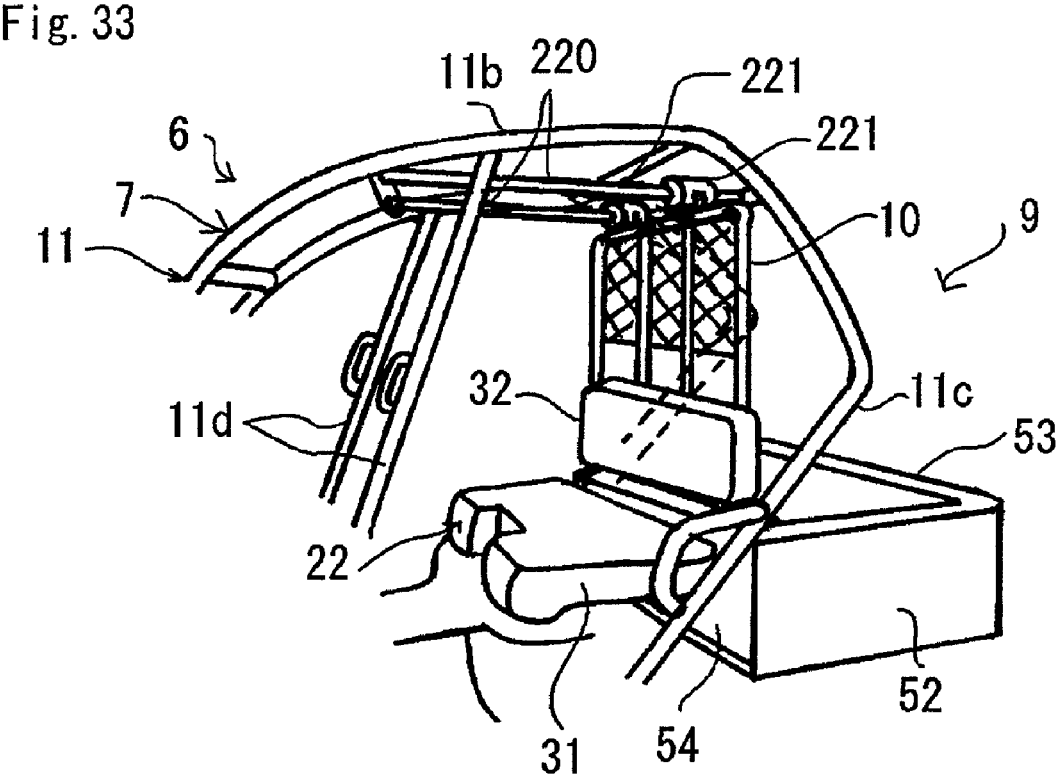
FIG. 33 is a perspective view of a cargo bed according to an eighth embodiment of the present invention.
Figure 34:
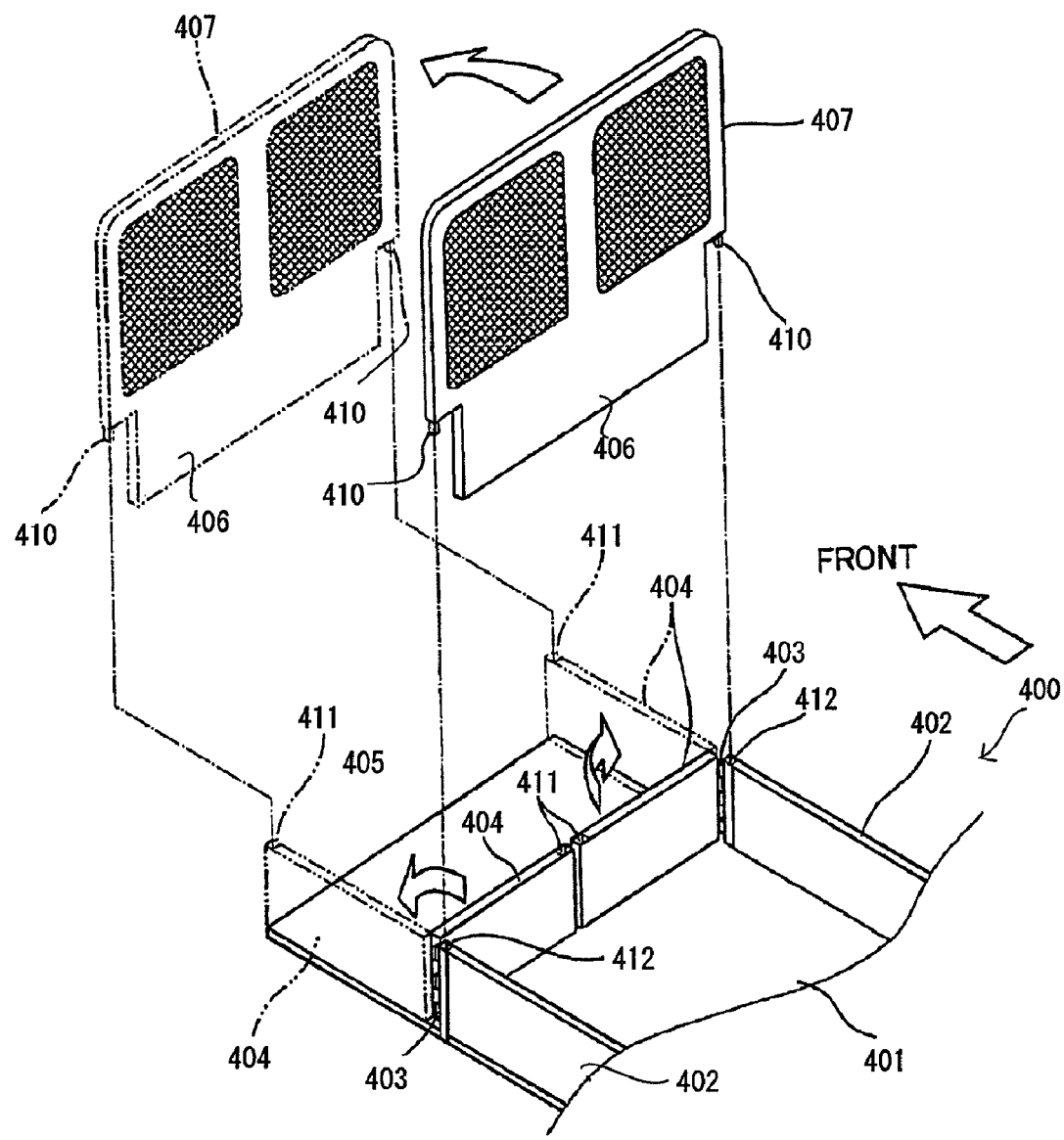
FIG. 34 is a perspective view of a related prior art.

FIG. 33 shows an eighth embodiment of the present invention. A pair of guide portions 220 extended in a front or rear direction and formed in a rod shape are provided at the upper end of the cabin frame 7 so as to be spaced apart from each other in a vehicle width direction. The screen shield 10 is formed so as to be separated from the front panel 54 of the cargo bed 9. A cylindrical slider 221 fitted in each of the guide portions 221 in a front or rear direction is provided at the upper end of the screen shield 10. That is, the screen shield 10 is overhung via the cylindrical slider 221 so as to be slidable on the upper guide portion 220 in a front or rear direction. The backrest 32 of the rear seat 22 is integrally provided at the lower end of the screen shield 10.

When the cargo bed 9 is not expanded, as shown in FIG. 33, the screen shield 10 is moved to the position corresponding to the front panel 54 in the non-expanded position. The slider 221 is fixed onto the guide portion 220 by an appropriate clamp mechanism. The backrest 32 is also fixed onto the front panel 54 and the like by an appropriate fixing mechanism.

When the cargo bed 9 is expanded, the seat bottom 31 of the rear seat 22 is retracted, and then, the cargo bed 9 is expanded and the screen shield 10 is slid in a front direction. Thereafter, the slider 221 is fixed onto the guide portion 220 by the appropriate clamp mechanism in the position corresponding to the front panel 54 in the expanded position, and the backrest 32 is fixed onto the front panel 54 by the appropriate fixing mechanism.

Note that the screen shield 10 can also be integrally formed with the front panel 54 to move the front panel 54 together with the screen shield 10.

As in this embodiment, when the screen shield is supported so as to be overhung, the guide portion 220 is efficiently arranged by using the upper space of the cabin 6. The rigidity of the cabin frame 7 can also be improved.

Other Embodiments (1) According to the first to seventh embodiments, the screen shield is formed so as to be separated from the front panel, and only the screen shield can be slidably supported by the guide portion such as the expandable side panel.

(2) According to the above-mentioned embodiments, the expandable side panel of the cargo bed is rotatably supported by the hinge. However, the expandable side panel can be supported by the expandable bottom plate so as to be slidable in a front or rear direction between the non-expanded position and the expanded position.

(3) The present invention is not limited to the configurations of the above-mentioned embodiments and includes various modification examples contemplated in the scope without departing from the contents described in the scope of the claims.

What is claimed is:

1. A pick-up style utility vehicle comprising:
a front seat;
a rear seat located behind the front seat;
a cargo bed located behind the rear seat and having side panels; and
a screen shield partitioning the cargo bed and a riding space in front of the cargo bed, wherein:
the cargo bed is changeable between an expanded state in which the cargo bed is expanded in a front direction into the riding space, and a non-expanded state not occupying the riding space;
the side panels of the cargo bed are provided with guide portions extending in a front and rear direction, respectfully;
the guide portions are formed on inner side surfaces of the side panels in a vehicle width direction; and
the screen shield is slidably supported in the front and rear direction by the guide portions so as to move in the front and rear direction between an expanded position and a non-expanded position.

2. The pick-up style utility vehicle according to claim 1, wherein a lock lever engaging mechanism, for fixing the screen shield at a front end of the side panels in the expanded state, is provided at a front end of at least one of the guide portions.

3. A pick-up style utility vehicle comprising:
a front seat;
a rear seat located behind the front seat;
a cargo bed located behind the rear seat and having side panels; and
a screen shield partitioning the cargo bed and a riding space in front of the cargo bed, wherein:
the cargo bed is changeable between an expanded state in which the cargo bed is expanded in a front direction into the riding space, and a non-expanded state not occupying the riding space;
the side panels of the cargo bed are provided with guide portions extending in a front and rear direction, respectively;
each of the guide portions is formed on a side surface of the respective side panel in a recess shape opened laterally, and an inclined surface inclined in a downward direction outward of the guide portion is formed at a lower end of the guide portion;
the guide portions are formed on inner side surfaces of the side panels in a vehicle width direction; and
the screen shield is slidably supported in the front and rear direction by the guide portions so as to move in the front and rear direction between an expanded position and a non-expanded position.

* * * * *